United States Patent
Dulin et al.

(10) Patent No.: US 7,397,804 B2
(45) Date of Patent: Jul. 8, 2008

(54) SYSTEM AND METHOD FOR SYNCHRONIZING DATA TRANSMISSION FROM MULTIPLE WIRELESS BASE TRANSCEIVER STATIONS TO A SUBSCRIBER UNIT

(75) Inventors: David R. Dulin, San Francisco, CA (US); Sanjay Kasturia, Palo Alto, CA (US); Partho Mishra, Cupertino, CA (US); Arogyaswami J. Paulraj, Stanford, CA (US); Matthew S. Peters, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/989,909

(22) Filed: Nov. 16, 2004

(65) Prior Publication Data

US 2005/0157679 A1 Jul. 21, 2005

Related U.S. Application Data

(63) Continuation of application No. 09/729,886, filed on Dec. 4, 2000, now Pat. No. 6,862,272, which is a continuation-in-part of application No. 09/708,170, filed on Nov. 7, 2000, now Pat. No. 6,567,387.

(51) Int. Cl.
*H04L 12/28* (2006.01)

(52) U.S. Cl. .................. 370/395.4; 370/310.2

(58) Field of Classification Search .......... 370/478, 370/487, 294, 295, 310.2, 314, 319, 321, 370/326, 328, 332, 336, 338, 344, 235, 229, 370/230, 239, 442, 330, 334, 349, 339, 337, 370/347, 395.4

See application file for complete search history.

(56) References Cited

U.S. PATENT DOCUMENTS

4,347,627 A    8/1982 Alter (Continued)

FOREIGN PATENT DOCUMENTS

EP    1 185 001    3/2002

(Continued)

OTHER PUBLICATIONS

A. Paulraj et al., "Taxonomy of Space-Time Processing for Wireless Networks", IEEE Proc.—Radar Sonar Navigation, vol. 145, No. 1, Feb. 1998, pp. 25-31.

(Continued)

*Primary Examiner*—Brenda Pham
(74) *Attorney, Agent, or Firm*—James S. Finn

(57) ABSTRACT

The invention includes an apparatus and a method for transmitting sub-protocol data units from a plurality of base transceiver stations to a subscriber unit. The method includes estimating time delays required for transferring the sub-protocol data units between a scheduler unit and each of the base transceiver stations. The method further includes the scheduler unit generating a schedule of time slots and frequency blocks in which the sub-protocol data units are to be transmitted from the base transceiver stations to the subscriber unit. The time delays are used to generate the schedule. The time delays can be used to generate a look ahead schedule that compensates for the timing delays of the sub-protocol data units from the scheduler unit to the base transceiver stations. The sub-protocol data units are wirelessly transmitted from the base transceiver stations to the subscriber unit according to the schedule. The time delays can be estimated by time-stamping sub-protocol data units before sub-protocol data units are transferred from the scheduler unit to the base transceiver stations, and estimating the time delays by comparing the times the sub-protocol data units are actually received by the base transceiver stations with the time-stamping.

5 Claims, 20 Drawing Sheets

U.S. PATENT DOCUMENTS

| | | | |
|---|---|---|---|
| 4,554,552 | A | 11/1985 | Alford et al. |
| 5,136,528 | A | 8/1992 | Fordham et al. |
| 5,345,599 | A | 9/1994 | Paulraj et al. |
| 5,361,276 | A | 11/1994 | Subrumanian |
| 5,504,936 | A | 4/1996 | Lee |
| 5,515,378 | A | 5/1996 | Roy et al. |
| 5,535,242 | A | 7/1996 | Bridida et al. |
| 5,559,810 | A | 9/1996 | Gilbert et al. |
| 5,592,471 | A | 1/1997 | Briskman |
| 5,592,490 | A | 1/1997 | Barratt et al. |
| 5,608,765 | A | 3/1997 | Tanoue |
| 5,627,861 | A | 5/1997 | Kataoka et al. |
| 5,642,353 | A | 6/1997 | Roy et al. |
| 5,715,240 | A | 2/1998 | Borras et al. |
| 5,721,733 | A | 2/1998 | Wang et al. |
| 5,729,825 | A | 3/1998 | Kostreski et al. |
| 5,732,075 | A | 3/1998 | Tangemann et al. |
| 5,752,193 | A | 5/1998 | Scholefield et al. |
| 5,781,583 | A | 7/1998 | Bruckert et al. |
| 5,815,488 | A | 9/1998 | Williams et al. |
| 5,819,168 | A | 10/1998 | Golden et al. |
| 5,828,658 | A | 10/1998 | Ottersten et al. |
| 5,832,044 | A | 11/1998 | Sousa et al. |
| 5,841,971 | A | 11/1998 | Longginou et al. |
| 5,867,478 | A | 2/1999 | Baum |
| 5,886,988 | A | 3/1999 | Yun et al. |
| 5,889,759 | A | 3/1999 | McGibney |
| 5,894,598 | A | 4/1999 | Shoki |
| 5,901,354 | A | 5/1999 | Menich et al. |
| 5,923,650 | A | 7/1999 | Chen et al. |
| 5,933,421 | A | 8/1999 | Alamouti et al. |
| 5,936,949 | A | 8/1999 | Pasternak et al. |
| 5,940,771 | A | 8/1999 | Gollnick et al. |
| 5,999,800 | A | 12/1999 | Choi et al. |
| 6,021,124 | A | 2/2000 | Haartsen et al. |
| 6,049,543 | A | 4/2000 | Sauer et al. |
| 6,058,105 | A | 5/2000 | Hochwald et al. |
| 6,058,114 | A | 5/2000 | Sethuram et al. |
| 6,064,662 | A | 5/2000 | Gitlin et al. |
| 6,067,290 | A | 5/2000 | Paulraj et al. |
| 6,069,883 | A | 5/2000 | Ejzak et al. |
| 6,081,566 | A | 6/2000 | Molnar et al. |
| 6,097,704 | A | 8/2000 | Jackson et al. |
| 6,097,771 | A | 8/2000 | Foschini |
| 6,108,565 | A | 8/2000 | Scherzer |
| 6,144,711 | A | 11/2000 | Raleigh et al. |
| 6,154,661 | A | 11/2000 | Goldburg |
| 6,163,547 | A | 12/2000 | De Vriendt et al. |
| 6,175,550 | B1 | 1/2001 | Van Nee |
| 6,185,258 | B1 | 2/2001 | Alamouti |
| 6,185,440 | B1 | 2/2001 | Barratt et al. |
| 6,192,026 | B1 | 2/2001 | Pollack et al. |
| 6,198,775 | B1 | 3/2001 | Khayrallah et al. |
| 6,243,367 | B1 | 6/2001 | Hussain |
| 6,249,669 | B1 | 6/2001 | Ogino et al. |
| 6,266,527 | B1 | 7/2001 | Mintz |
| 6,278,697 | B1 | 8/2001 | Brody et al. |
| 6,317,420 | B1 | 11/2001 | Schiff |
| 6,317,435 | B1 | 11/2001 | Tiedemann et al. |
| 6,317,466 | B1 | 11/2001 | Foschini et al. |
| 6,351,499 | B1 | 2/2002 | Paulraj et al. |
| 6,370,129 | B1 | 4/2002 | Huang |
| 6,400,699 | B1 | 6/2002 | Airy et al. |
| 6,411,824 | B1 | 6/2002 | Eidson |
| 6,441,721 | B1 | 8/2002 | Tajima et al. |
| 6,452,981 | B1 | 9/2002 | Raleigh et al. |
| 6,473,399 | B1 | 10/2002 | Johansson et al. |
| 6,473,467 | B1 | 10/2002 | Wallace |
| 6,490,256 | B1 | 12/2002 | Jones et al. |
| 6,507,605 | B1 | 1/2003 | Fukumoto et al. |
| 6,535,497 | B1 | 3/2003 | Raith |
| 6,563,790 | B1 | 5/2003 | Yu et al. |
| 6,583,400 | B2 | 6/2003 | Miyoshi |
| 6,650,878 | B1 | 11/2003 | Abe et al. |
| 6,714,514 | B1 | 3/2004 | Espax et al. |
| 6,757,241 | B1 | 6/2004 | Jones et al. |
| 6,763,491 | B2 | 7/2004 | McDonnell |
| 6,778,501 | B1 | 8/2004 | Malmgren et al. |
| 6,802,035 | B2 | 10/2004 | Catreux et al. |
| 6,842,487 | B1 | 1/2005 | Larsson |
| 6,850,481 | B2 | 2/2005 | Wu et al. |
| 6,862,272 | B2 * | 3/2005 | Dulin et al. .................. 370/330 |
| 6,888,809 | B1 | 5/2005 | Foschini et al. |
| 2001/0003088 | A1 | 6/2001 | Ogino et al. |
| 2001/0028677 | A1 | 10/2001 | Wang et al. |
| 2002/0000948 | A1 | 1/2002 | Chun et al. |
| 2002/0071407 | A1 | 6/2002 | Koo et al. |
| 2002/0097684 | A1 | 7/2002 | Da et al. |
| 2003/0035490 | A1 | 2/2003 | Gollamudi |
| 2003/0147353 | A1 | 8/2003 | Clarkson et al. |

FOREIGN PATENT DOCUMENTS

| | | |
|---|---|---|
| WO | WO 96/22662 | 7/1996 |
| WO | WO 98/34424 | 8/1996 |
| WO | WO 98/09381 | 3/1998 |
| WO | WO 98/09385 | 3/1998 |
| WO | WO 98/09381 | 5/1998 |
| WO | WO 00/79722 | 12/2000 |

OTHER PUBLICATIONS

Paulraj, A. et al., "Space-Time Processing for Wireless Communications", IEEE Signal Processing Magazine, Nov. 1997, pp. 49-83.

Paulraj, A., "Taxonomy of Space-Time Processing for Wireless Networks", IEEE Proc.—Radar Sonar Navig., vol. 145, No. 1 Feb. 1998.

Andrews, M. et al., "Tripping the Capacity of Wireless Communications using Electromagnetic Polarization", Nature Magazine, Jan. 18, 2001, pp. 316-318, vol. 409, Macmillian Magazine.

Bertoni, Henry L., "Talk is cheap in the City", Nature Magazine, Jan. 18, 2001, pp. 291-292, vol. 409, Macmillian Magazines.

Sumeet Sanhu and A. Paulraj, Oct. 6, 2000, Wireless Conference Presented Paper.

Raliegh et al., "Spatio-Temporal Coding for Wireless Communication", Mar. 1998, IEEE Transactions on Communications.

A. Maleki et al., "Space-Time Coding Transmission Optimization for Wireless Channels" Jul. 1998, IEEE.

A. Scaglione et al., "Filterbank Transceivers Optimization Information Rate in Block Transmission over Drepssive Channnels", Apr. 1999, IEEE.

A. Scaglione et al., Redundant Filterbank Precoders and Equalizers Part 1: Unification and Optimal Designs, Jul. 1999 Transactions on Signal Processing.

R. Negi et al., Adaptive Antennas for Space-Time Coding over Block-Time Invariant Multi-Path Fading Channels, 1999, IEEE.

D. Shiu et al., Fading Correlation and Its Effects on the Capacity of the Multielement Antenna Systems, IEEE Transactions on Communications, vol. 48, No. 3, Mar. 2000.

H. Bolcskei et al., Performance of Space-Time Codes in the Presence of Spatial Fading Correlation, IEEE, 2000.

H. Sampath et al. Generalized Linear Precoder and Decoder Design for MIMO Channels using the Weighted MMSE Criterion, IEEE Transactions on Communications, vol. XX, No. Y, 2001.

* cited by examiner

SYSTEM AND METHOD FOR SYNCHRONIZING DATA TRANSMISSION FROM MULTIPLE WIRELESS BASE TRANSCEIVER STATIONS TO A SUBSCRIBER UNIT

CROSS-REFERENCE TO RELATED APPLICATION

The present patent application is a Continuation of application Ser. No. 09/729,886, filed Dec. 4, 2000 now U.S. Pat. No. 6,862,272 which is a Continuation-in-Part of U.S. patent application Ser. No. 09/708,170, filed Nov. 7, 2000 now U.S. Pat. No. 6,567,387.

FIELD OF THE INVENTION

The invention relates generally to wireless communications. More particularly, the invention relates to synchronizing transmission of data between multiple base transceiver stations and subscriber units, providing spatial multiplexing and communication diversity.

BACKGROUND OF THE INVENTION

Wireless communication systems commonly include information carrying modulated carrier signals that are wirelessly transmitted from a transmission source (for example, a base transceiver station) to one or more receivers (for example, subscriber units) within an area or region.

Spatial Multiplexing

Spatial multiplexing is a transmission technology that exploits multiple antennae at both the base transceiver station and at the subscriber units to increase the bit rate in a wireless radio link with no additional power or bandwidth consumption. Under certain conditions, spatial multiplexing offers a linear increase in spectrum efficiency with the number of antennae. For example, if three antennae are used at the transmitter (base transceiver station) and the receiver (subscriber unit), the stream of possibly coded information symbols is split into three independent substreams. These substreams occupy the same channel of a multiple access protocol. Possible same channel multiple access protocols include a same time slot in a time-division multiple access protocol, a same frequency slot in frequency-division multiple access protocol, a same code sequence in code-division multiple access protocol or a same spatial target location in space-division multiple access protocol. The substreams are applied separately to the transmit antennae and transmitted through a radio channel. Due to the presence of various scattering objects in the environment, each signal experiences multipath propagation.

The composite signals resulting from the transmission are finally captured by an array of receiving antennae with random phase and amplitudes. At the receiver array, a spatial signature of each of the received signals is estimated. Based on the spatial signatures, a signal processing technique is applied to separate the signals, recovering the original substreams.

FIG. 1 shows three transmitter antenna arrays 110, 120, 130 that transmit data symbols to a receiver antenna array 140. Each transmitter antenna array includes spatially separate antennae. A receiver connected to the receiver antenna array 140 separates the received signals.

FIG. 2 shows modulated carrier signals traveling from a transmitter 210 to a receiver 220 following many different (multiple) transmission paths.

Multipath can include a composition of a primary signal plus duplicate or echoed images caused by reflections of signals off objects between the transmitter and receiver. The receiver may receive the primary signal sent by the transmitter, but also receives secondary signals that are reflected off objects located in the signal path. The reflected signals arrive at the receiver later than the primary signal. Due to this misalignment, the multipath signals can cause intersymbol interference or distortion of the received signal.

The actual received signal can include a combination of a primary and several reflected signals. Because the distance traveled by the original signal is shorter than the reflected signals, the signals are received at different times. The time difference between the first received and the last received signal is called the delay spread and can be as great as several micro-seconds.

The multiple paths traveled by the modulated carrier signal typically results in fading of the modulated carrier signal. Fading causes the modulated carrier signal to attenuate in amplitude when multiple paths subtractively combine.

Communication Diversity

Antenna diversity is a technique used in multiple antenna-based communication system to reduce the effects of multipath fading. Antenna diversity can be obtained by providing a transmitter and/or a receiver with two or more antennae. These multiple antennae imply multiple channels that suffer from fading in a statistically independent manner. Therefore, when one channel is fading due to the destructive effects of multi-path interference, another of the channels is unlikely to be suffering from fading simultaneously. By virtue of the redundancy provided by these independent channels, a receiver can often reduce the detrimental effects of fading.

An individual transmission link exists between each individual base transceiver station antenna and a subscriber unit in communication with the base transceiver station. The previously described spatial multiplexing and communication diversity require multiple antennas to each have transmission links with a single subscriber unit. Optimally, the base transceiver station can schedule data transmission according to the transmission link quality.

It is desirable to have an apparatus and method that provides scheduling of transmission of data blocks between multiple base station transceivers and receivers (subscriber) units. It is desirable that the scheduling be adaptive to the quality of transmission links between the base station transceivers and the receivers (subscriber) units. It is additionally desirable that the apparatus and method allow for spatial multiplexing and communication diversity through the multiple base station transceivers.

SUMMARY OF THE INVENTION

As shown in the drawings for purposes of illustration, the invention is embodied in an apparatus and a method for scheduling wireless transmission of data blocks between multiple base transceiver stations and multiple receiver (subscriber) units. The scheduling accounts for time delays that exist between a scheduler unit and the base transceiver stations. The scheduling can be based on the quality of a transmission link between the base transceiver stations and the receiver units, the amount of data requested by the receiver units, and/or the type of data requested by the receiver units. The scheduling generally includes assigning frequency blocks and time slots to each of the receiver units for receiving or transmitting data blocks. The transmission scheduling allows for spatial multiplexing and communication diversity through spatially separate base station transceivers.

A first embodiment of the invention includes a method of transmitting sub-protocol data units from a plurality of base transceiver stations to a subscriber unit. The method includes estimating time delays required for transferring the sub-protocol data units between a scheduler unit and each of the base transceiver stations. The method further includes the scheduler unit generating a schedule of time slots and frequency blocks in which the sub-protocol data units are to be transmitted from the base transceiver stations to the subscriber unit. This embodiment can include the time delays being used to generate the schedule.

A second embodiment of the invention is similar to the first embodiment. The second embodiment further includes the time delays being used to generate the schedule by using the time delays to project the timing of when the sub-protocol data units are to be wirelessly transmitted from the base transceiver stations.

A third embodiment is similar to the second embodiment. The third embodiment includes a the time delays being used to generate a look ahead schedule that compensates for the timing delays of transferring the sub-protocol data units from the scheduler unit to the base transceiver stations.

A fourth embodiment is similar to the first embodiment. The fourth embodiment includes wirelessly transmitting the sub-protocol data units from the base transceiver stations to the subscriber unit according to the schedule.

A fifth embodiment is similar to the first embodiment. The fifth embodiment includes the estimating time delays required for transferring the sub-protocol data units between the scheduler unit and the base transceiver stations by time-stamping sub-protocol data units before sub-protocol data units are transferred from the scheduler unit to the base transceiver stations, and estimating the time delays by comparing the times the sub-protocol data units are actually received by the base transceiver stations with the times of the time-stamping.

A sixth embodiment is similar to the first embodiment. The sixth embodiment includes the scheduler receiving standard protocol data units from a network and sub-dividing the standard protocol data units forming the sub-protocol data units.

A seventh embodiment is similar to the first embodiment. The seventh embodiment includes synchronizing the base transceiver stations to a common reference clock. The synchronization can include receiving a global positioning satellite (GPS) signal, and generating the common reference clock from the GPS signal.

A eighth embodiment is similar to the first embodiment. The eighth embodiment includes the sub-protocol data units being transmitted between the base transceiver stations and the subscriber unit in data blocks, the data blocks being defined by a frequency block and time slot. Generally, the scheduler unit generates a map that determines when the data blocks are transmitted the base transceiver stations and the subscriber unit.

An ninth embodiment includes a cellular wireless communication system. The communication system includes a scheduler unit. The scheduler unit receives the protocol data units from a network and sub-dividing the protocol data units into sub-protocol data units. A plurality of base transceiver stations receive the sub-protocol data units, and wirelessly transmitting the sub-protocol data units to a subscriber unit. Time delays for transferring the sub-protocol data units from the scheduler unit to the base transceiver stations are estimated. The scheduler unit determines a schedule protocol for transmission of the sub-protocol data units by the plurality of base transceiver stations. The schedule accounts for the time delays.

Other aspects and advantages of the present invention will become apparent from the following detailed description, taken in conjunction with the accompanying drawings, illustrating by way of example the principles of the invention.

DETAILED DESCRIPTION

Figure 1:
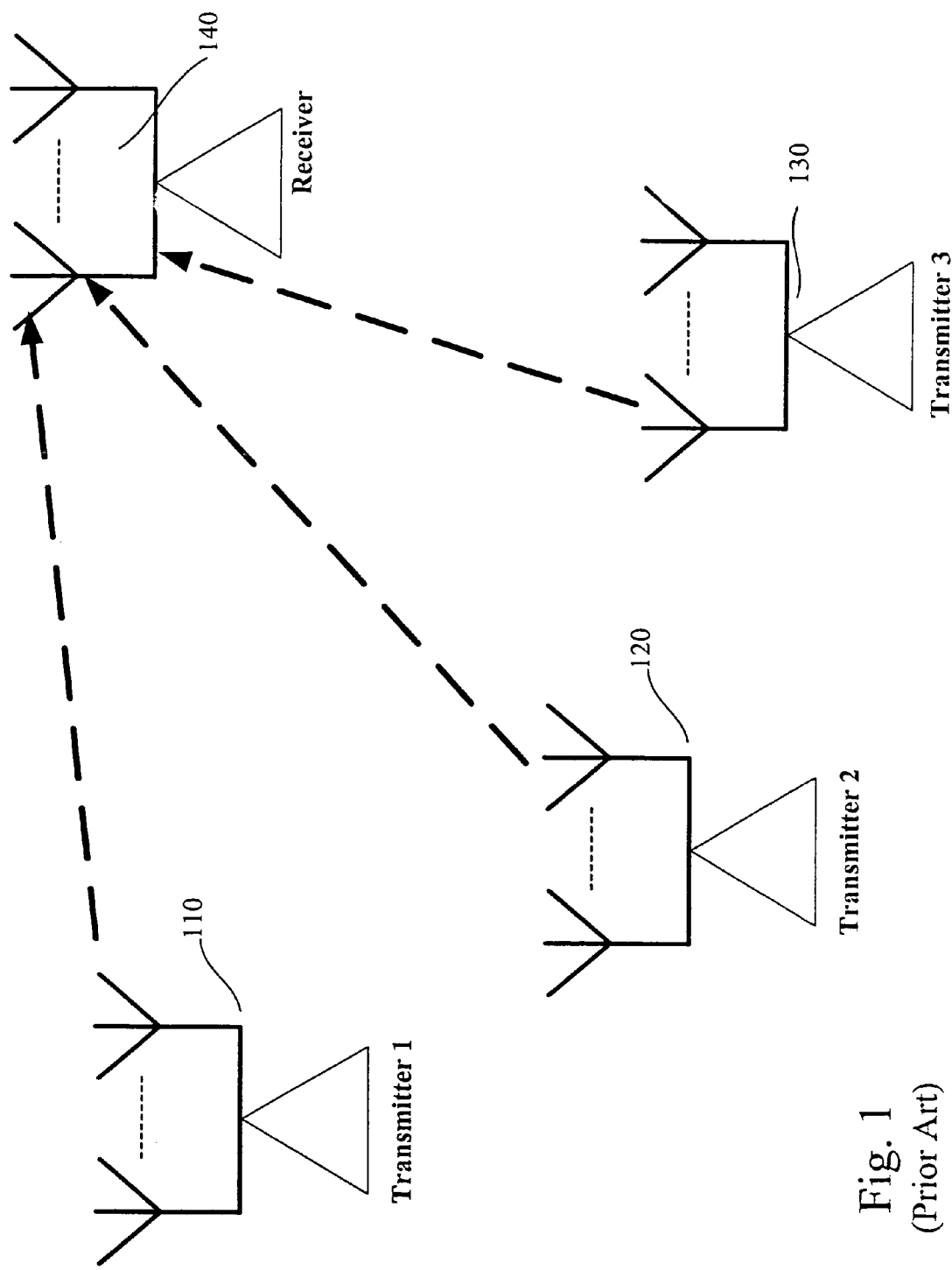
FIG. 1 shows a prior art wireless system that includes spatially separate transmitters.
Figure 2:
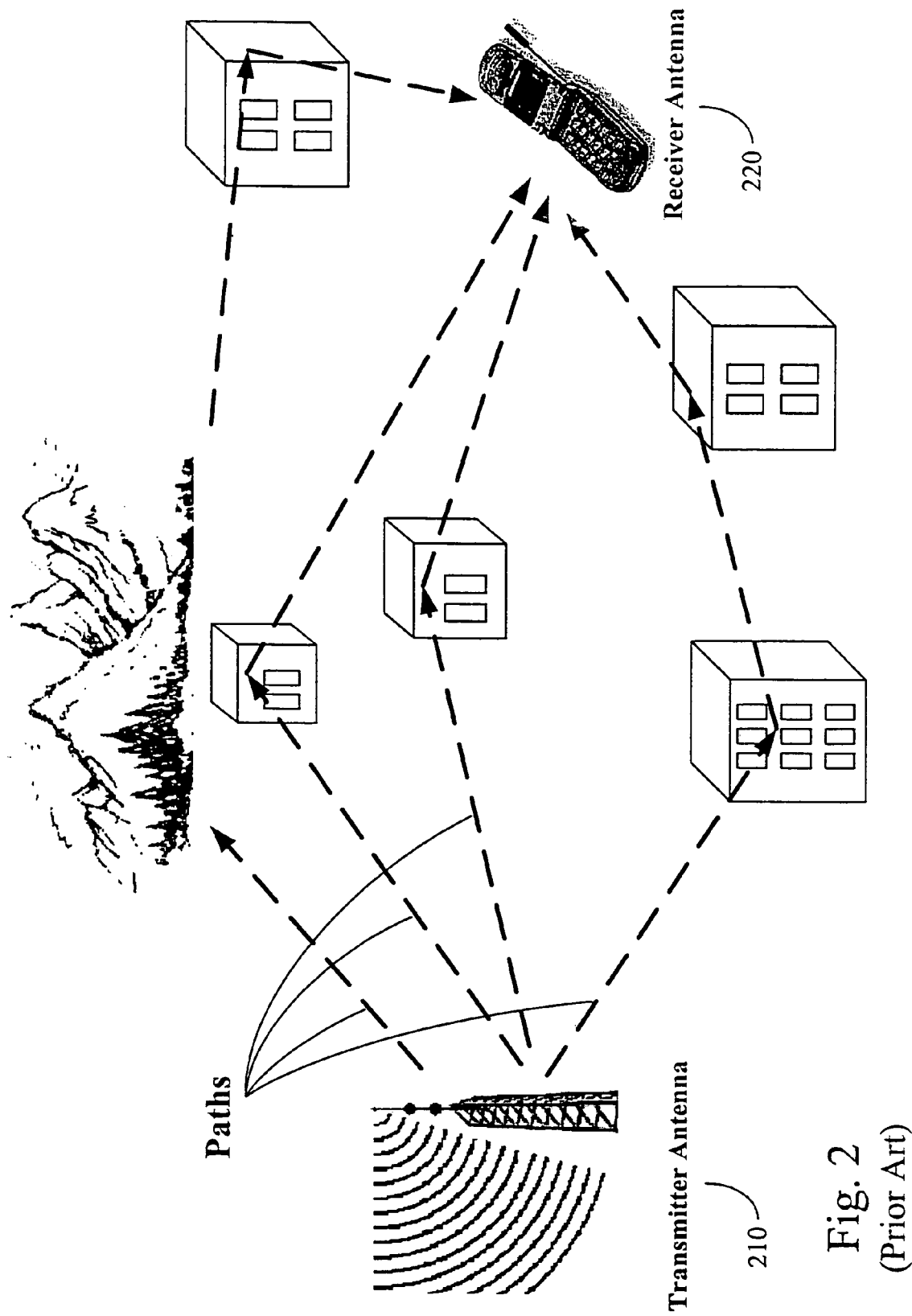
FIG. 2 shows a prior art wireless system that includes multiple paths from a system transmitter to a system receiver.

As shown in the drawings for purposes of illustration, the invention is embodied in an apparatus and a method for scheduling wireless transmission of data blocks between multiple base transceiver stations and multiple receiver (subscriber) units. The scheduling accounts for time delays that exist between a scheduler unit and the base transceiver stations. The scheduling can be based on the quality of a transmission link between the base transceiver stations and the receiver units, the amount of data requested by the receiver units, and/or the type of data requested by the receiver units. The scheduling generally includes assigning frequency blocks and time slots to each of the receiver units for receiving or transmitting data blocks. The transmission scheduling allows for spatial multiplexing and communication diversity through spatially separate base station transceivers.

Figure 3:
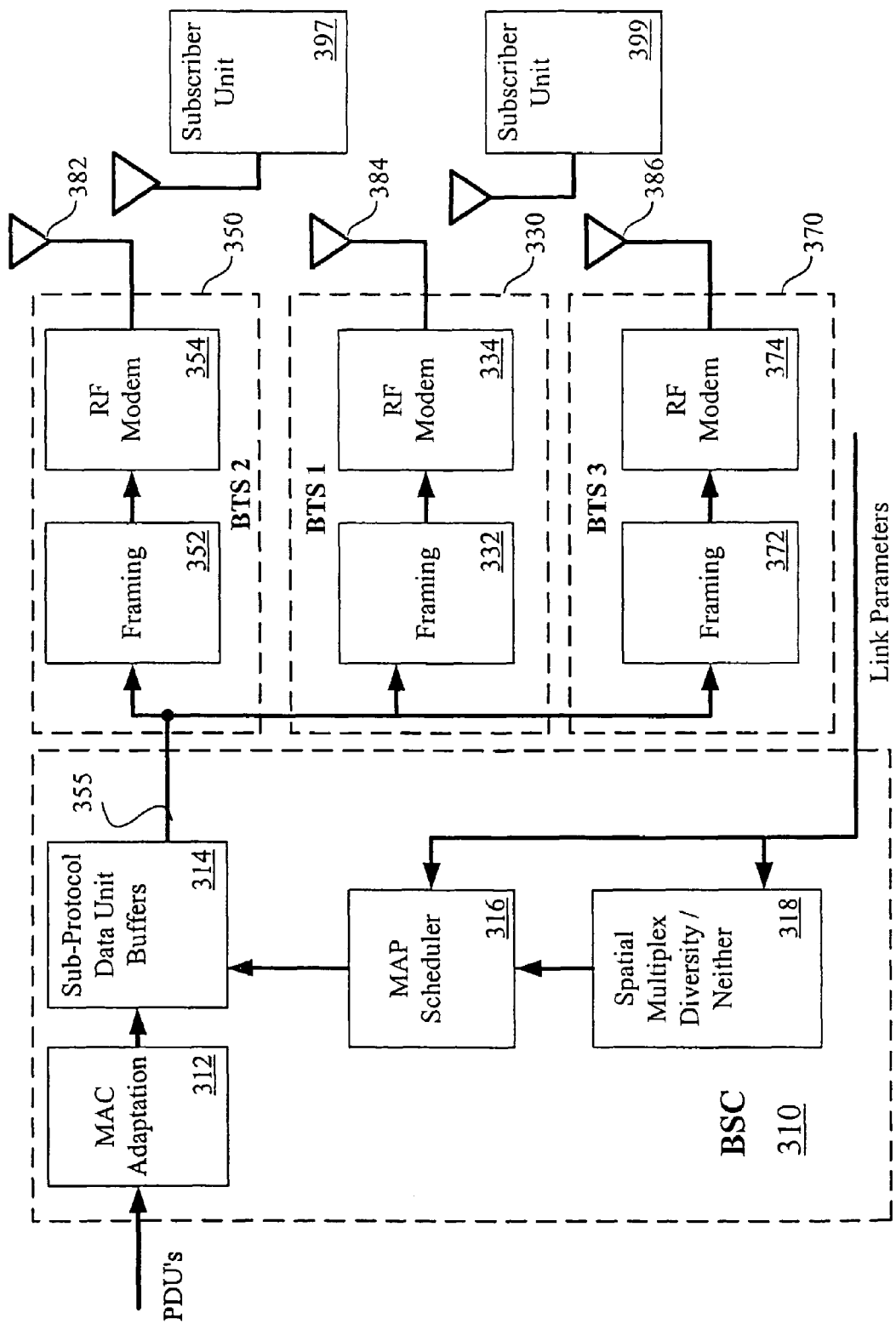
FIG. 3 shows an embodiment of the invention.

FIG. 3 shows an embodiment of the invention. The embodiment includes a base station controller 310 receiving standard protocol data units (PDUs). The PDUs are divided into smaller sub-protocol data units that are stored in memory in the base station controller 310. The base station controller 310 is connected to multiple base transceiver stations 330, 350, 370. The base station controller 310 includes a scheduler 316. The scheduler 316 generates a map that designates time slots and frequency block in which the sub-protocol data units are to be transmitted from the base transceiver stations 330, 350, 370 to receiver (subscriber) units 397, 399 (down link), and time slots and frequency blocks in which other sub-protocol data units are to be transmitted from the receiver (subscriber) units 397, 399 to the base transceiver stations 330, 350, 370 (up link).

The data interface connections 355 between the base station controller 310 and the multiple base transceiver stations 330, 350, 370, are generally implemented with standard networking protocols because these protocol have been well established and adopted. The standard networking protocols can be, for example, asynchronous transmission mode (ATM) or internet protocol (IP) interconnection networks. Other types of standard networking protocols can be used. The sub-protocol data units are not directly adaptable for transmission over ATM or IP networks. Therefore, the sub-protocol data units must be encapsulated within an ATM or IP packet switched data unit. The encapsulation process will be discussed later.

A media access control (MAC) adaptation unit 312 within the base station controller 310 receives the protocol data units from a standard computer network. The protocol data units can be ethernet frames, ATM cells or IP packets. The MAC adaptation unit 312 divides the protocol data units into smaller sub-protocol data units that are more adaptable for transmission within wireless communication systems. Smaller sub-protocol data units facilitate error recovery through retransmission.

The digital circuitry required to divide or break large groups of data into smaller groups of data is well known in the art of digital circuit design.

The sub-protocol data units are stored within sub-protocol data unit buffers 314 of the base station controller 310. The sub-protocol data unit buffers 314 provide easy access to the sub-protocol data units according to a transmission schedule.

A scheduler 316 generates a map or schedule of transmission of the sub-protocol data. This includes when and at what frequency range sub-protocol data units are to be received by the receiver (subscriber) unit 397, 399, and when and at what frequency range the receiver (subscriber) units 397, 399, transmit sub-protocol data units back to the base station transceivers 330, 350, 370. The map is transmitted to the receiver (subscriber) units 397, 399, so that each receiver (subscriber) unit knows when to receive and transmit sub-protocol units. A map is transmitted once per a unit of time that is generally referred to as a frame. The time duration of the frame is variable.

The scheduler 316 receives information regarding the quality of transmission links between the base station transceivers 330, 350, 370 and the receiver (subscriber) units 397, 399. The quality of the links can be used to determine whether the transmission of data to a particular receiver should include spatial multiplexing or communication diversity. Additionally, the scheduler 316 receives data requests from the receiver (subscriber) units. The data requests include information regarding the size of the data request, and the data type of the data request. The scheduler includes the link quality information, the data size, and the data type for generating the schedule. A detailed discussion of an implementation of the scheduler will follow.

The scheduler 316 accesses the sub-protocol data units within the sub-protocol data buffers 314. A predetermined number of sub-protocol data units are retrieved by the scheduler 316 and ordered within frames of framing units 332, 352, 372 within the base transceiver stations 330, 350, 370. A map of the schedule is include within every frame for the purpose of indicating to each receiver unit when and at what frequency data blocks requested by the receiver unit will be transmitted, and when and at what frequency data blocks can be transmitted from the receiver unit. The frame includes a predetermined number of sub-protocol data units as will be described later. Implementations of the framing units 332, 352, 372 will be discussed later.

The framed sub-protocol data units are received by coding, diversity processing, multi-carrier modulation units 334, 354, 374. The coding within the units 334, 354, 374 will be discussed later. The units 334, 354, 374 can include diversity processing of the sub-protocol units. Diversity communications and processing is well known in the field of communications.

Multi-carrier modulator units 334, 354, 374 each generate a plurality of multiple-carrier modulated signals. Each multi-carrier modulator 334, 354, 374 receives a processed (coding and/or diversity processing) sub-protocol data unit stream and generates a multiple-carrier modulated signal based on the corresponding processed sub-protocol data unit stream. The multiple-carrier modulated signals are frequency up-converted and amplified as is well known in the art of communication systems.

An output of a first multi-carrier modulator 334 is connected to a first transmit antenna 384. An output of a second multi-carrier modulator 354 is connected to a second transmit antenna 382. An output of a third multi-carrier modulator 374 is connected to a third transmit antenna 386. The first transmit antenna 384, the second transmit antenna 382, and the third transmit antenna 386 can be located within an antenna array at a single base station. Alternatively, the first transmit antenna 384, the second transmit antenna 382, and the third transmit antenna 386 can each be located at separate base stations. The first transmit antenna 384, the second transmit antenna 382, and the third transmit antenna 386 can have different polarization states. Circuitry associated with the transmitter chains can be separately located with the antennas 384, 382, 386.

The embodiment of FIG. 3 includes three transmit base transceiver stations. It is to be understood that the invention can include two or more transmit base transceiver stations. The additional antennas can be driven by additional multi-carrier modulators that each include separate corresponding processed sub-protocol data unit streams.

The embodiment of FIG. 3 includes subscriber units 397, 399. The subscribers units 397, 399 can include multiple spatially separate subscriber antennae.

Multiple transmitter antennae and/or multiple receiver antennae allow the wireless communication system to include spatial multiplexing and communication diversity. As described earlier, spatial multiplexing and communication diversity can improve the capacity of the communication system and reduce the effects of fading and multi-path resulting in increased capacity.

Spatial multiplexing and diversity require sub-protocol data units transmitted from separate base stations and to be received by common receiver (subscriber) units to be precisely synchronized in time. That is, if a receiver (subscriber) unit is to receive sub-protocol data units from separate base transceiver stations, in a same frequency block and time slot, the base transceiver stations must be synchronized, and time delays between the base station controller and the base transceiver stations must be known.

Timing and Synchronization of the Base Transceiver Stations

The embodiments of the invention include transmitting information from multiple base transceiver stations that are physically separated. As previously stated, the scheduler 316 generates a map that depicts time slots and frequency block in which the sub-protocol data units are to be transmitted from the base transceiver stations 330, 350, 370 to receiver (subscriber) units 397, 399, and time slots and frequency blocks in which other sub-protocol data units are to be transmitted from the receiver (subscriber) units 397, 399 to the base transceiver stations 330, 350, 370. However, because the base transceiver stations are typically located at different locations than the base station controller, a time delay generally exists between the base station controller and the base transceiver stations. That is, when sub-protocol data units are accessed from the sub-protocol data unit buffers for transmission from a base transceiver station, a delay will occur due to the time required to transfer the sub-protocol data units to the base transceiver station.

In order for a multiple antenna system to properly operate, sub-protocol data units must be simultaneously transmitted from multiple base transceiver stations. Additionally, the scheduler must be able to determine which sub-protocol data units are simultaneously transmitted. The above-described delay of the sub-protocol data units generally requires the base transceiver stations and the base transceiver controller to be synchronized to a common reference clock. Additionally, the scheduler generally specifies the transmission time of each sub-protocol data units.

The propagation and transmission delays between the base station controller to the base transceiver stations, are typically variable. To compensate for the variable delay, the base station controller can include "look-ahead" scheduling. That is, the scheduler computes a schedule for a particular frame, T units of time prior to the actual transmission time of that frame. Generally, T is the worst case transmission delay between the base station controller and the base transceiver stations.

The worst case transmission delay between the base station controller and the base transceiver stations can be determined by sending information from the base station controller to the base transceiver stations that is time stamped. The time stamped information can be compared with common reference clock at each of the base transceiver stations to determine the worst case delay between the base station controller and each of the base transceiver stations. The delay associated with each base transceiver station can be communicated back to the base station controller so that future scheduling can include "look-ahead" scheduling. That is, the scheduler computes a schedule for a particular frame, T units of time prior to the actual transmission time of that frame. T can be base upon one or more transfer delay times, and can include an extra margin.

The sub-protocol data units are transferred from the base station controller to the base transceiver stations through the previously described standard networking protocols. The standard network protocols (for example, ATM or IP) are generally termed "packet switched" networks. Transfer delays through a packet switched network are dependent upon the amount of packets being switched through the network at a given point in time. That is, if the amount of packets (traffic) of the packet switched network is greater than usual, then the transfer delay times will be greater than usual. Therefore, the delay of the network between the base controller station and the base transceiver stations can vary depending upon the level of traffic on the network.

The variable delays through the network between the base controller station and the base transceiver stations can be compensated for by periodically sampling the delay times and adjusting the look ahead time T accordingly. The look ahead time T can be set to a mean or average value of the measured time delays. Additionally, an extra bit of margin can be added to the time T to make absolutely sure that the look ahead time T is greater than the delay times between the base controller station and the base transceiver stations. The margin can be base upon a statistical estimation. For example, the margin can be two or three sigmas greater than a mean of several different measured delay times.

The discussion above for estimating the delay time between a base controller station and transmitting base transceiver stations is also applicable for estimating the delay between a home base transceiver station and transmitting base transceiver stations.

It should be understood that the look ahead scheduling is only required when transmitting simultaneously from more than one base transceiver station to a single subscriber (receiver) unit. If communication diversity or spatial multiplexing is required for transmission, then look ahead scheduling is required because more than one base transceiver station is transmitting to a subscriber (receiver) unit. If transmission is between only a single base transceiver station and a single subscriber unit, then look ahead scheduling is not required.

Generally, there are three modes of transmission. A first mode includes transmission between a single base transceiver station and a single subscriber unit. This mode does not require look ahead scheduling. A second mode includes diversity or spatial multiplexing transmission, and requires look ahead scheduling. A third mode includes both single base station and multiple base transceiver station transmission. The third mode is useful for transmitting sub-protocol data units through a single base transceiver station during an initial period of transmission before spatial multiplexing through multiple base transceiver stations can be initiated.

Radio Frequency (RF) signals are coupled between the transmitter antennae and the receiver antennae. The RF signals are modulated with data streams comprising the transmitted symbols. The signals transmitted from the transmitter antennae can be formed from different data streams (spatial multiplexing) or from one data stream (communication diversity) or both.

Figure 4:
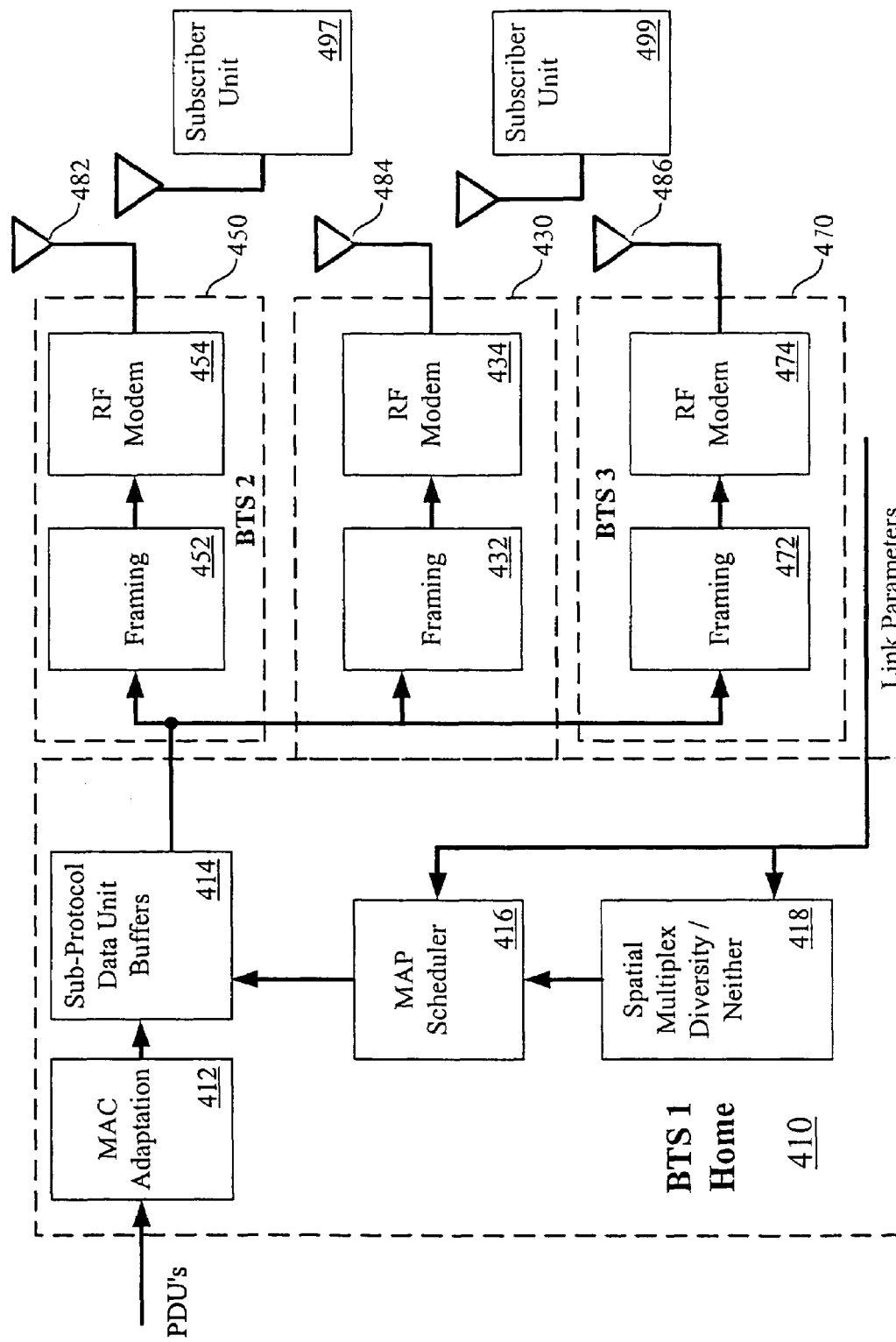
FIG. 4 shows another embodiment of the invention.

FIG. 4 shows another embodiment of the invention. The embodiment of FIG. 4 includes a home base transceiver station 410. The home base transceiver station 410 includes the functionality of both the base controller station 310 and the first base transceiver station 330 of FIG. 3.

By combining the functionality of the base controller station and a base transceiver station, the overall complexity of the system can be reduced because an interconnection between the base controller station and one base transceiver station is eliminated. Additionally, compensation for the delay between the base controller station and the one base transceiver station no longer required.

An embodiment of the invention includes the home base transceiver station being the base transceiver station that has the best quality link with the receiver unit. The link quality can change with time. Therefore, the base transceiver station designated as the home base transceiver station can change with time.

Typically, the base transceiver station that has the highest quality transmission link with the receiver unit is scheduled to transmit the greatest amount of information to the receiver unit. This configuration limits the amount of sub-protocol data units that must be transferred from the home base transceiver station to the other base transceiver stations.

Base Transceiver Station Interface

FIG. 3 shows a base station controller that interfaces with several base transceiver stations. FIG. 4 shows a base transceiver station that interfaces with several other base transceiver stations. As previously mentioned, these network interfaces can be implemented with either asynchronous transmission mode (ATM) or internet protocol (IP) technology. It is to be understood that ATM and IP technologies are provided as examples. Any packet switched network protocol can be used.

Figure 5:
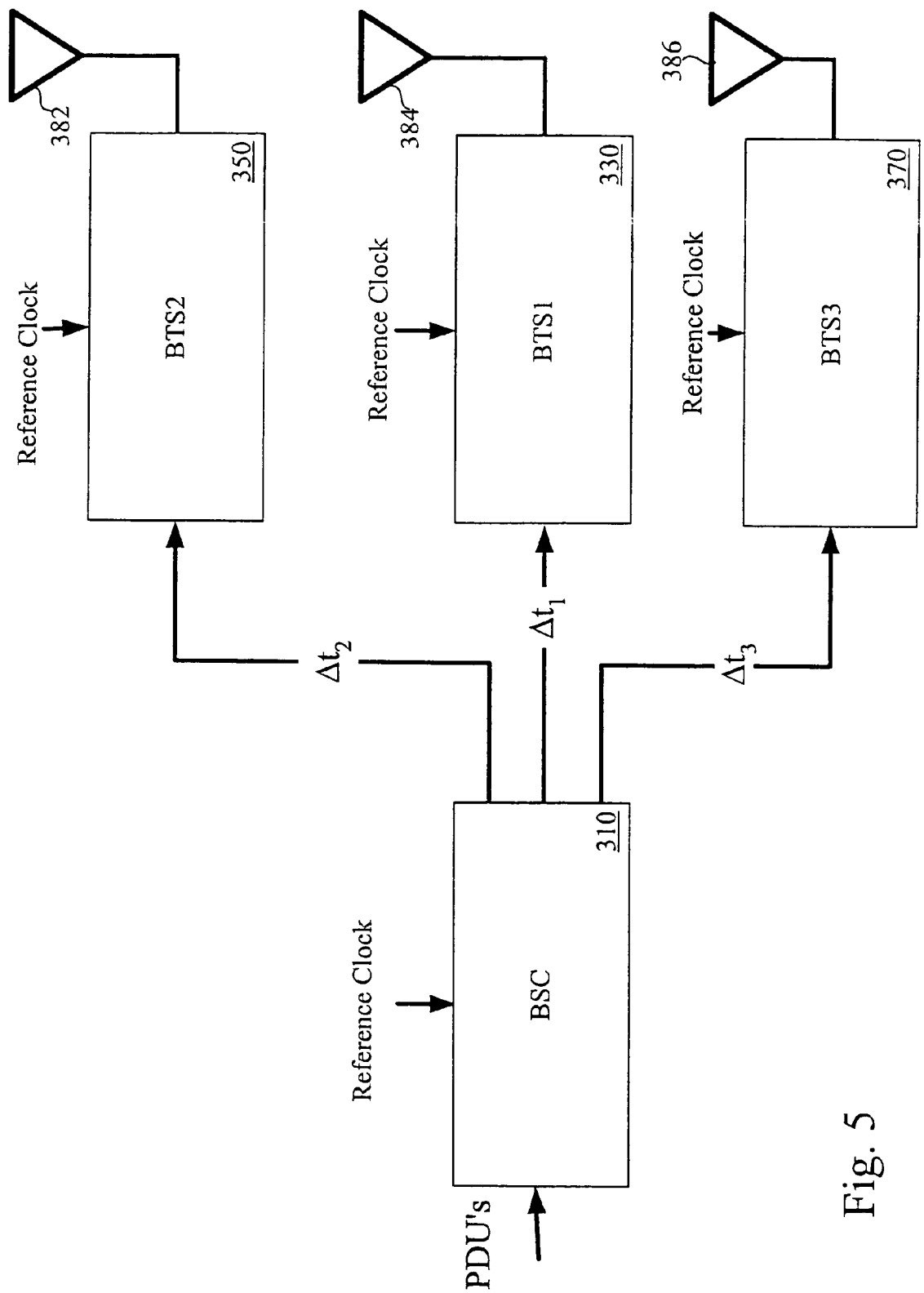
FIG. 5 show the time delays between the base station controller and the base transceiver stations of FIG. 3.

FIG. 5 shows the time delays between the base station controller 310 and the base transceiver stations 330, 350, 370 of FIG. 3. A first time delay $t_1$ indicates the time delay required for transferring sub-protocol data units from the base station controller 310 to the first base transceiver station 330. A second time delay $t_2$ indicates the time delay required for transferring sub-protocol data units from the base station controller 310 to the second base transceiver station 350. A third time delay $t_3$ indicates the time delay required for transferring sub-protocol data units from the base station controller 310 to the third base transceiver station 370. Generally, the time delays $t_1$, $t_2$, and $t_3$ are not equal. As mentioned previously, to compensate for the variable delays, the scheduler computes a schedule for a particular frame, T units of time prior to the actual transmission time of that frame. Generally, T is greater than the greatest transmission time delay $t_1$, $t_2$, and $t_3$.

As previously described, the variable delays through the network between the base controller station and the base transceiver stations can be compensated for by periodically sampling the delay times and adjusting the look ahead time T accordingly. The look ahead time T can be set to a mean or average value of the measured time delays. Additionally, an extra bit of margin can be added to the time T to make absolutely sure that the look ahead time T is greater than the delay times between the base controller station and the base transceiver stations. The margin can be base upon a statistical estimation. For example, the margin can be two or three sigmas greater than a mean of several different measured delay times.

Figure 6:
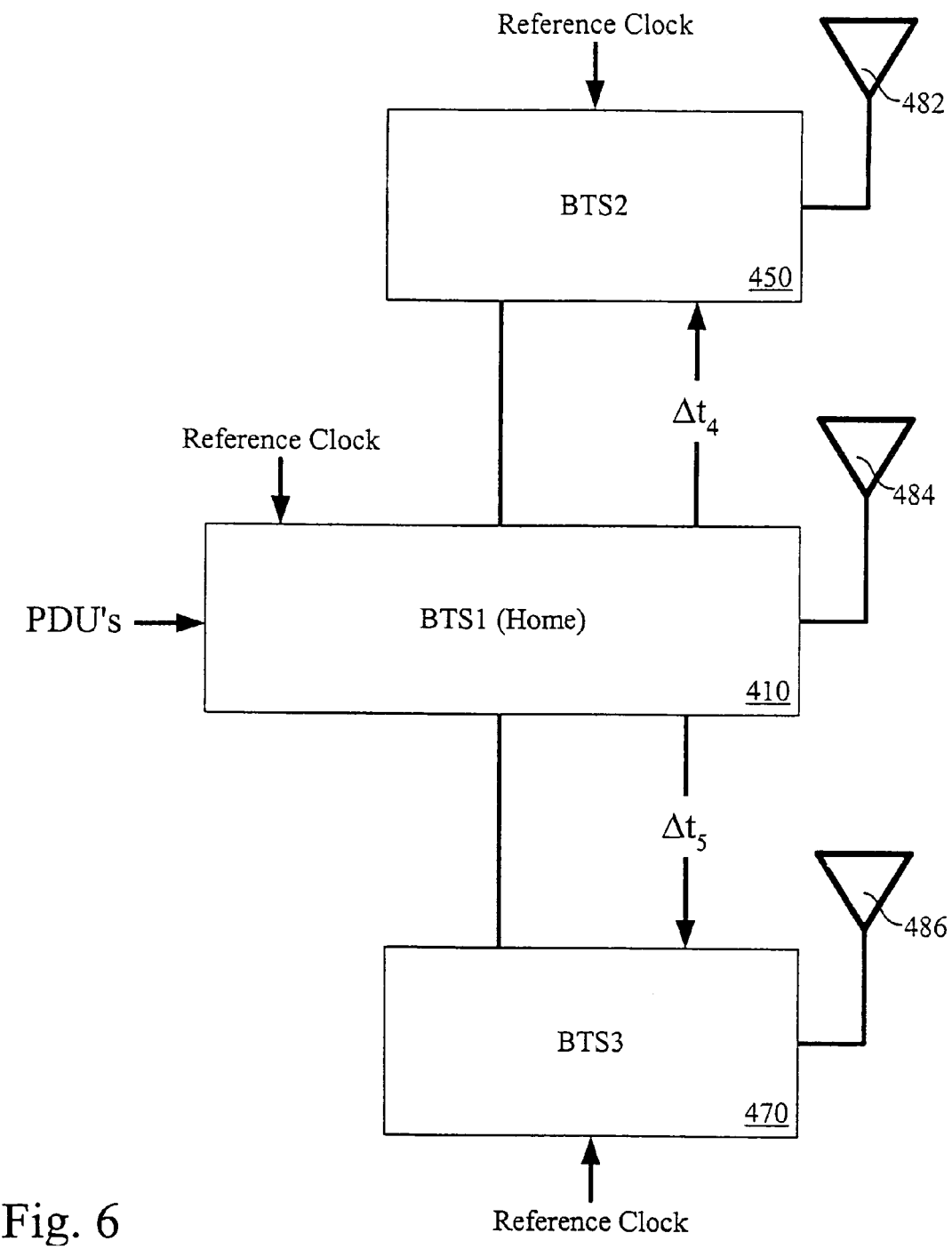
FIG. 6 shows the time delays between the home base transceiver station and the base transceiver stations of FIG. 4.

FIG. 6 shows the time delays between the home base transceiver station 410 and the base transceiver stations 450, 470 of FIG. 4. A fourth time delay $t_4$ indicates the time delay required for transferring sub-protocol data units from the home base transceiver station 410 to the base transceiver station 450. A fifth time delay $t_5$ indicates the time delay required for transferring sub-protocol data units from home base transceiver station 410 to the base transceiver station 470. Generally, the time delays $t_4$ and $t_5$ are not equal. As mentioned previously, to compensate for the variable delays, the scheduler computes a schedule for a particular frame, T units of time prior to the actual transmission time of that frame. Generally, T is greater than the greatest transmission time delay $t_4$, $t_5$.

The delay associated with each base transceiver station can be communicated back to the base station controller or home base transceiver station so that future scheduling can include "look-ahead" scheduling. That is, the scheduler computes a schedule for a particular frame, T units of time prior to the actual transmission time of that frame.

Sub-protocol Data Unit Encapsulation

Figure 7:
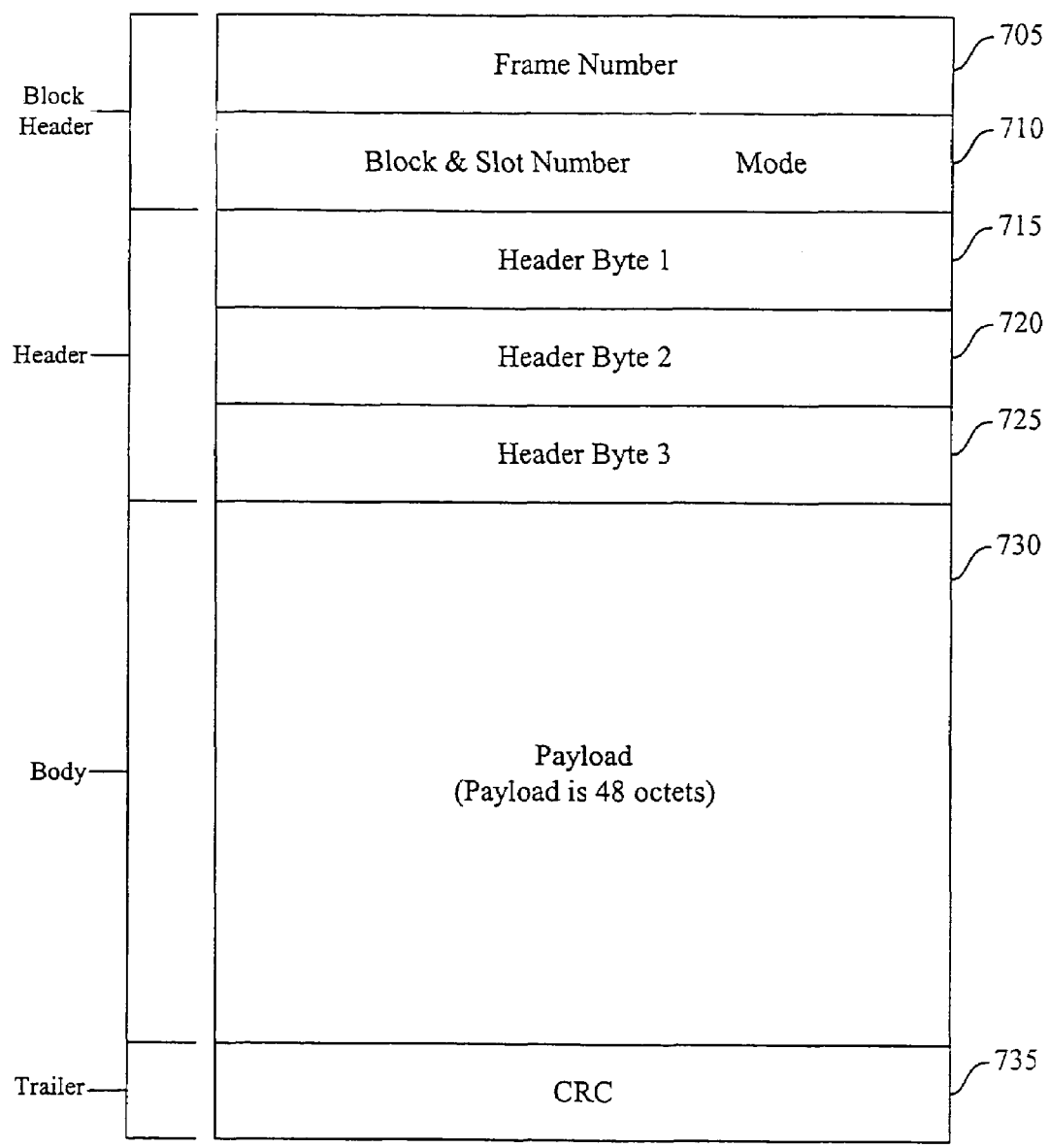
FIG. 7 shows an example format of a sub-protocol data unit.

FIG. 7 shows an embodiment of a sub-protocol data unit. The sub-protocol data unit includes block header bytes 705, 710, header bytes 715, 720, 725, payload bytes 730 and a cyclic redundancy check byte 735.

The block header bytes include a frame number byte 705 and a block, slot and mode byte 710. The frame number byte indicates the frame in which the sub-protocol data unit is to be transmitted. The block and slot indicate the frequency block and time slot the sub-protocol data unit is to be transmitted. The mode can be used to indicate the modulation type, coding, order of spatial multiplexing and order of diversity to be used during transmission of the sub-protocol data unit.

The header bytes 715, 720, 725 include header information that is necessary for proper transmission of the sub-protocol data units. The header information can include identifier information, sub-protocol data unit type information (for example, IP or ethernet packets or voice over IP), a synchronization bit for encryption, request-to-send information for indicating additional sub-protocol data unit are to be transmitted, end of data unit information to indicate that a present sub-protocol data unit is a last data unit if an ethernet frame or IP packet is fragmented to one or more sub-protocol data units, and acknowledgement information to indicate whether sub-protocol data unit have been successfully sent. It should be noted, that this list is not exhaustive.

The payload bytes 730 include the data information that is to be transmitted within the sub-protocol data units.

Figure 8:
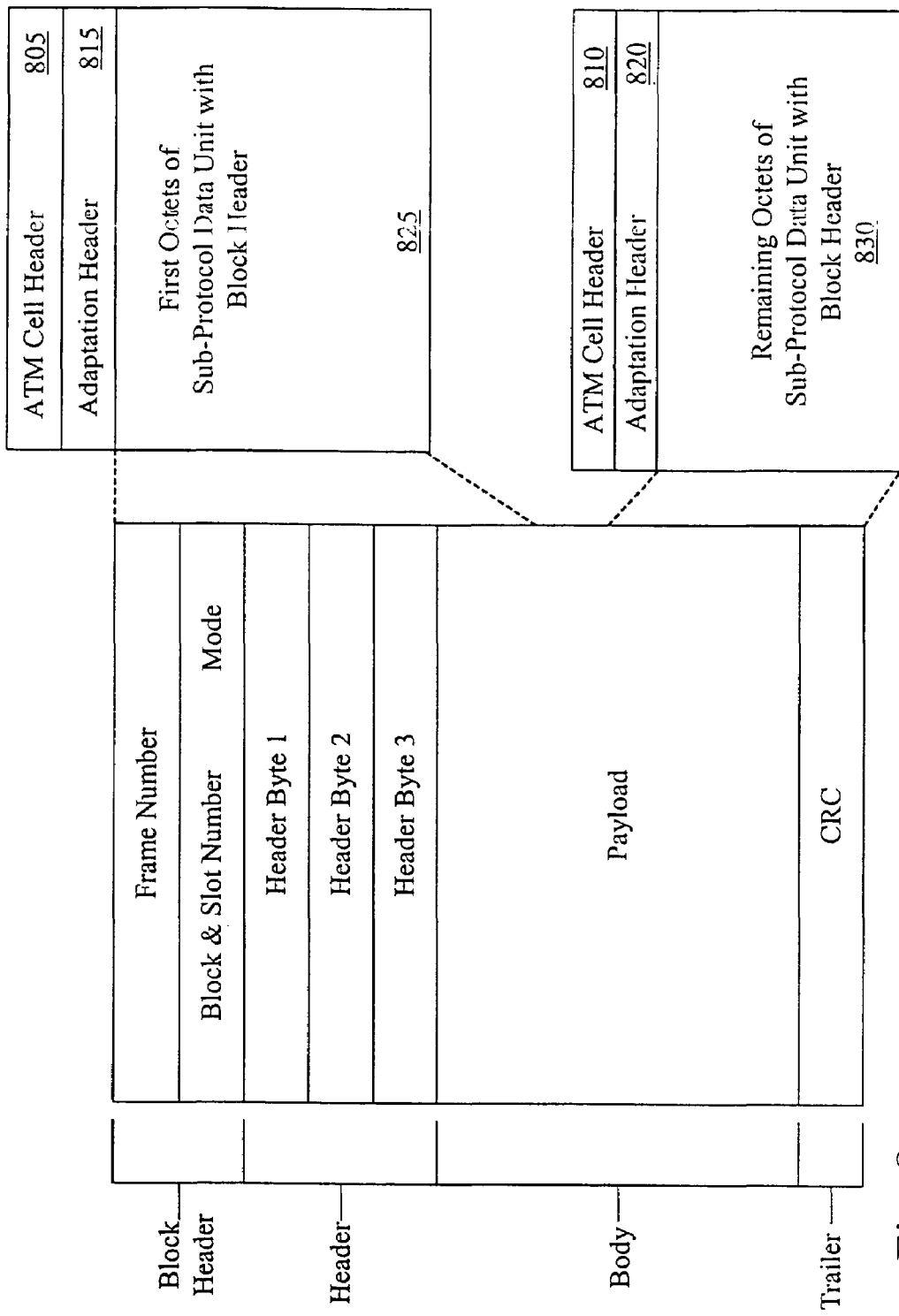
FIG. 8 shows how the example sub-protocol data unit of FIG. 7 can be encapsulated within an asynchronous transmission mode (ATM) network transmission unit.

FIG. 8 shows a sub-protocol data unit encapsulated within an ATM cell. The basic unit of transmission of an ATM network is an ATM cell. Embodiments of the sub-protocol data units include the sub-protocol data units including more bytes than are included within a typical ATM cell. In this situation, the sub-protocol data unit must be segmented into two or more pieces (depending on the size of the sub-protocol data unit). An ATM adaptation layer is required to segment the sub-protocol data units into one or more ATM cells. The ATM cells can then be transmitted over an ATM network from the scheduler (base controller station or home base transceiver station) to the base transceiver stations. Each of the base transceiver stations receiving the ATM cell must include control circuitry to reconstruct the sub-protocol data units upon being received by the respective base transceiver stations.

A first ATM cell includes an ATM cell header 805, an adaptation header 815 and an ATM payload 825 that includes a first section of a sub-protocol data unit. A second ATM cell includes an ATM cell header 810, an adaptation header 820 and an ATM payload 830 that includes a second section (remaining section) of the sub-protocol data unit. ATM protocols are well understood in the field of electronic networking.

Encapsulation of data units within smaller or larger standard data units is a process that is understood by those skilled in the art of network design. The implementation of encapsulation processes is understood by those skilled in the art of network design.

Figure 9:
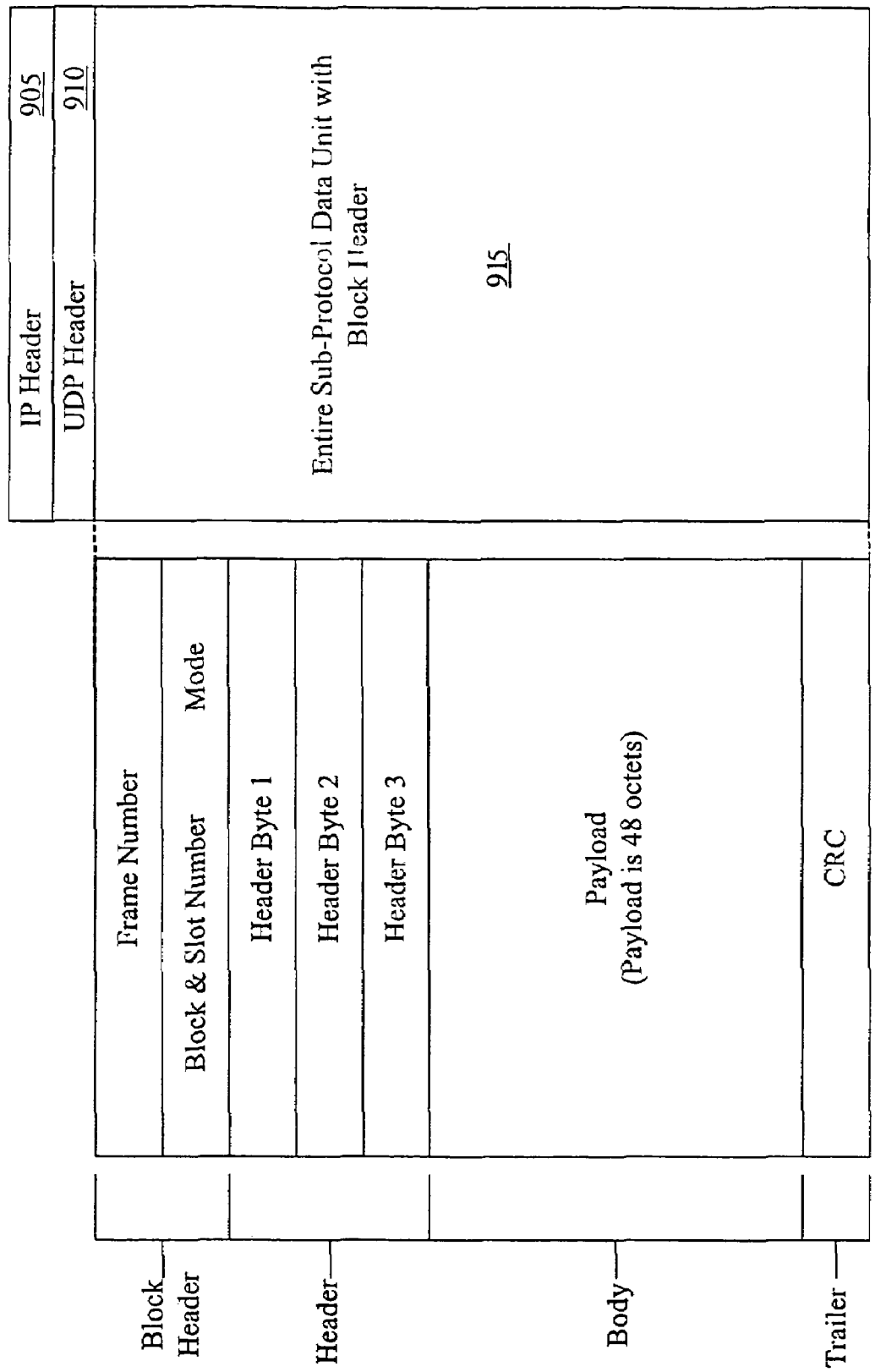
FIG. 9 shows how the example sub-protocol data unit of FIG. 7 can be encapsulated within an internet protocol (IP) network transmission unit.

FIG. 9 shows a sub-protocol data unit encapsulated within an IP packet. The basic unit of transmission of an IP network is an IP packet. Generally, the IP packet comprises an IP header, a transport header 910, and a variable length payload 915. The embodiment of the sub-protocol data unit of FIG. 5 can generally fit within the payload 915 of an IP packet.

Reference Clock

To provide for proper timing of the transmission of the sub-protocol data units, each of the base transceiver stations are synchronized to a common reference clock. Generally, the reference clock can be generated through the reception and processing of global positioning system (GPS) satellite signals.

Down Link Transmission

Figure 10A:
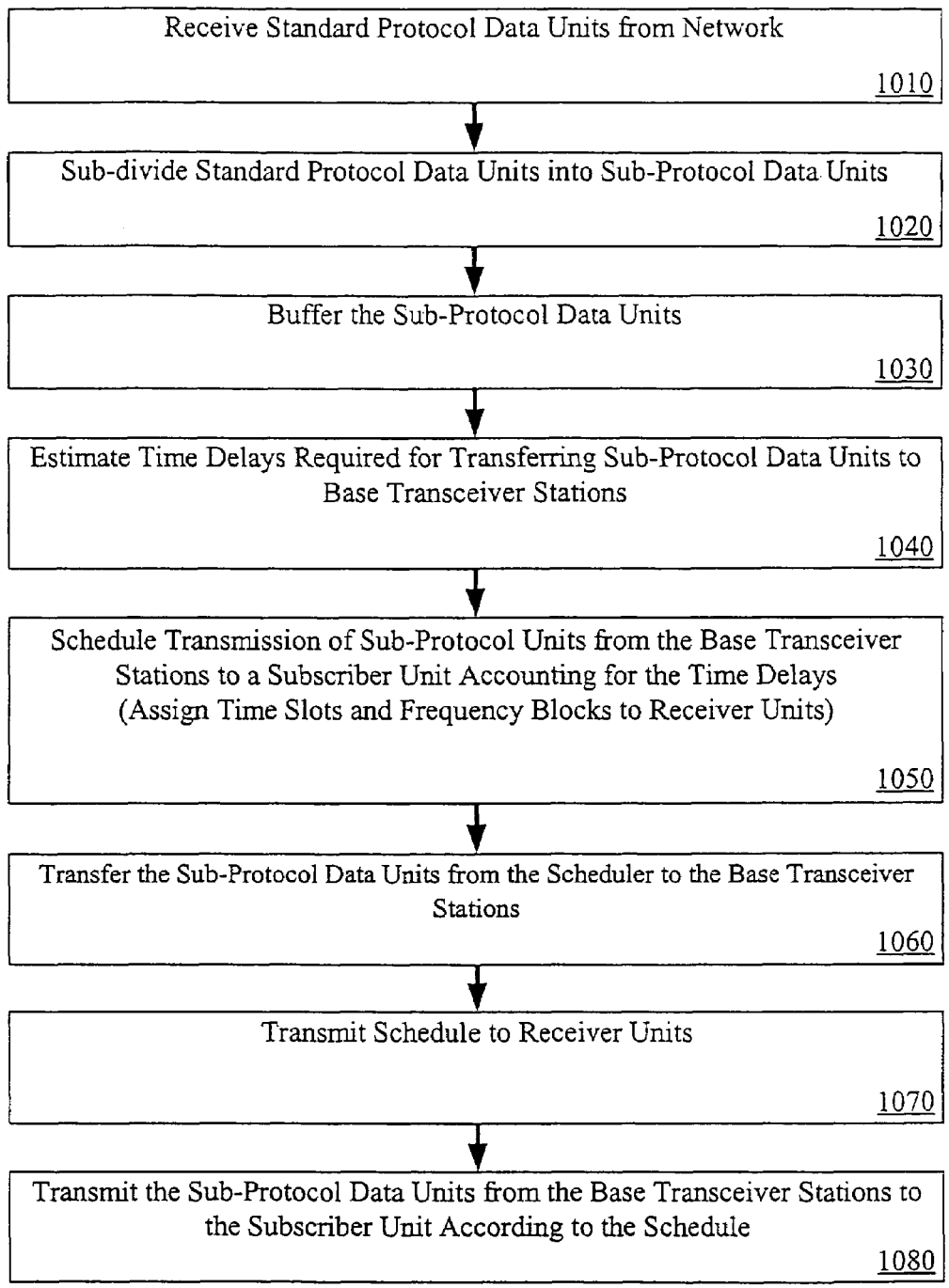
FIG. 10A shows a flow chart of steps included within an embodiment of the invention.

FIG. 10A shows a flow chart of steps included within an embodiment of the invention. A first step 1010 includes receiving the PDUs from a network. A second step 1020 includes creating sub-protocol data units from the PDUs. A third step 1030 includes storing the sub-protocol data units in sub-protocol data unit buffers. A fourth step 1040 includes estimating time delays required for transferring the sub-protocol data units to the base transceiver stations. A fifth step 1050 includes scheduling time slots and frequency block to each of the subscriber units while accounting for the estimated time delays. A sixth step 1060 includes transferring the sub-protocol data units from the scheduler to the base transceiver stations. A seventh step 1070 includes transmitting the schedule to the subscriber units. A eighth step 1080 includes transmitting the sub-protocol data units to the subscriber according to the schedule. It is to be understood that the steps of the flow chart of FIG. 10A are not necessarily sequential.

Up Link Transmission

Figure 10B:
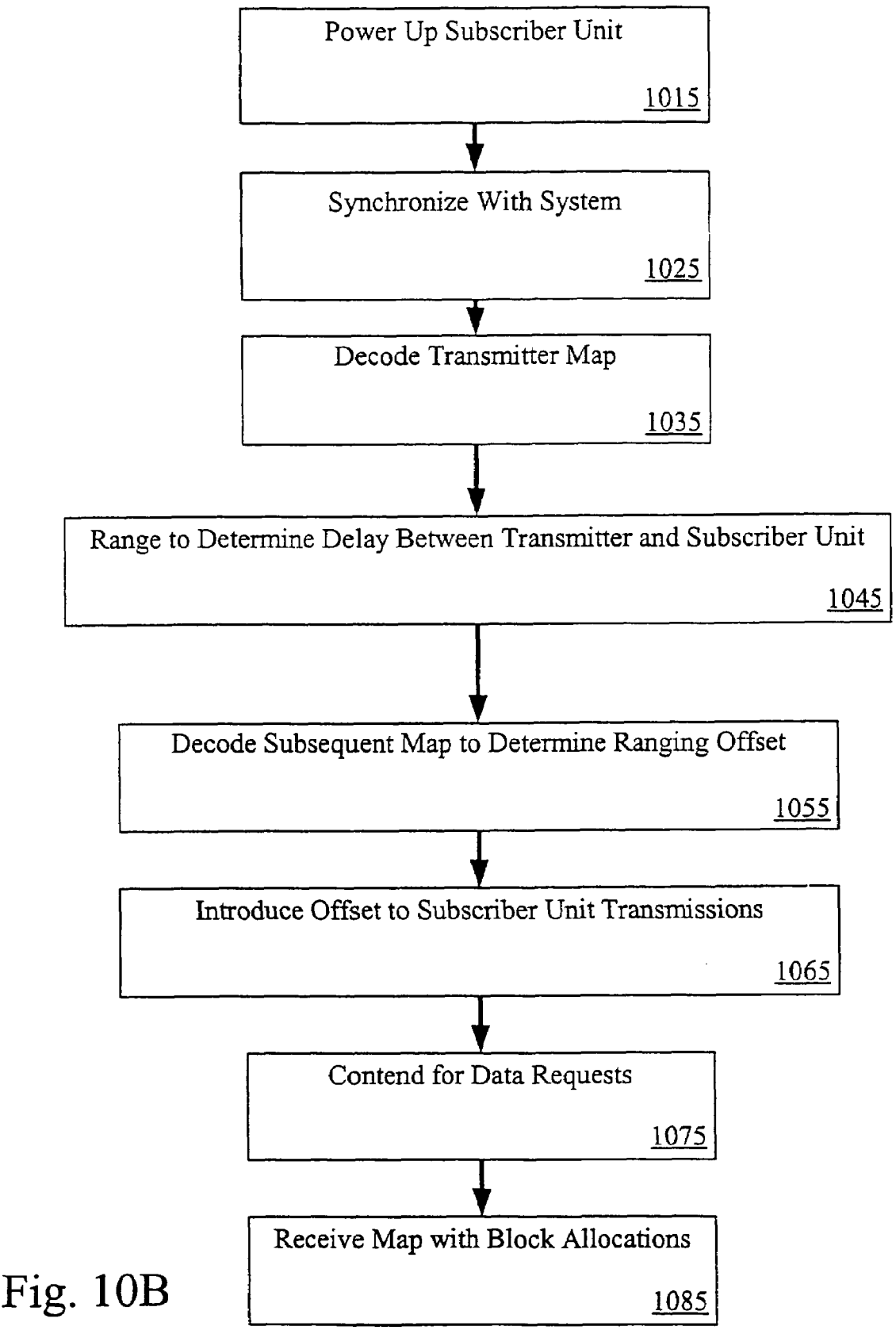
FIG. 10B show another flow chart of steps included within another embodiment of the invention.

FIG. 10B show another flow chart of steps included within another embodiment of the invention. This embodiment includes the up link transmission procedures.

A first step 1015 includes powering up a subscriber unit.

A second step 1025 includes synchronizing the subscriber unit with frames being transmitted being transmitted from a base transceiver station. The base transceiver station transmits information within the frames that allows the subscriber units to phase-lock or synchronize with the base transceiver station. Generally, all base transceiver stations of a cellular system are synchronized with to a common reference clock signal.

A third step 1025 includes decoding a map transmitted within the base transceiver station. The transmitted map allows identification of ranging blocks and contention blocks that the subscriber can use for transmitting information to the base transceiver station.

A fourth step 1045 includes the subscriber unit sending ranging information. The ranging information is sent for estimating the propagation delay between the subscriber unit and the base transceiver station. The estimated delay is used for ensuring that transmit timing of the subscriber unit is adjusted to compensate for the propagation delay.

A fifth step 1055 includes decoding a map that is subsequently sent by the base transceiver station for determining a ranging offset. The ranging offset can be used for future transmission by the subscriber unit.

A sixth step 1065 includes introducing the ranging offset in future subscriber unit transmissions.

A seventh step 1075 includes contending for data requests with other subscriber units.

An eighth step 1085 includes receiving a map with block allocations in which data requests (up link) can be sent by the subscriber unit to the base transceiver station.

Down Link Service Flow Request

Figure 11A:
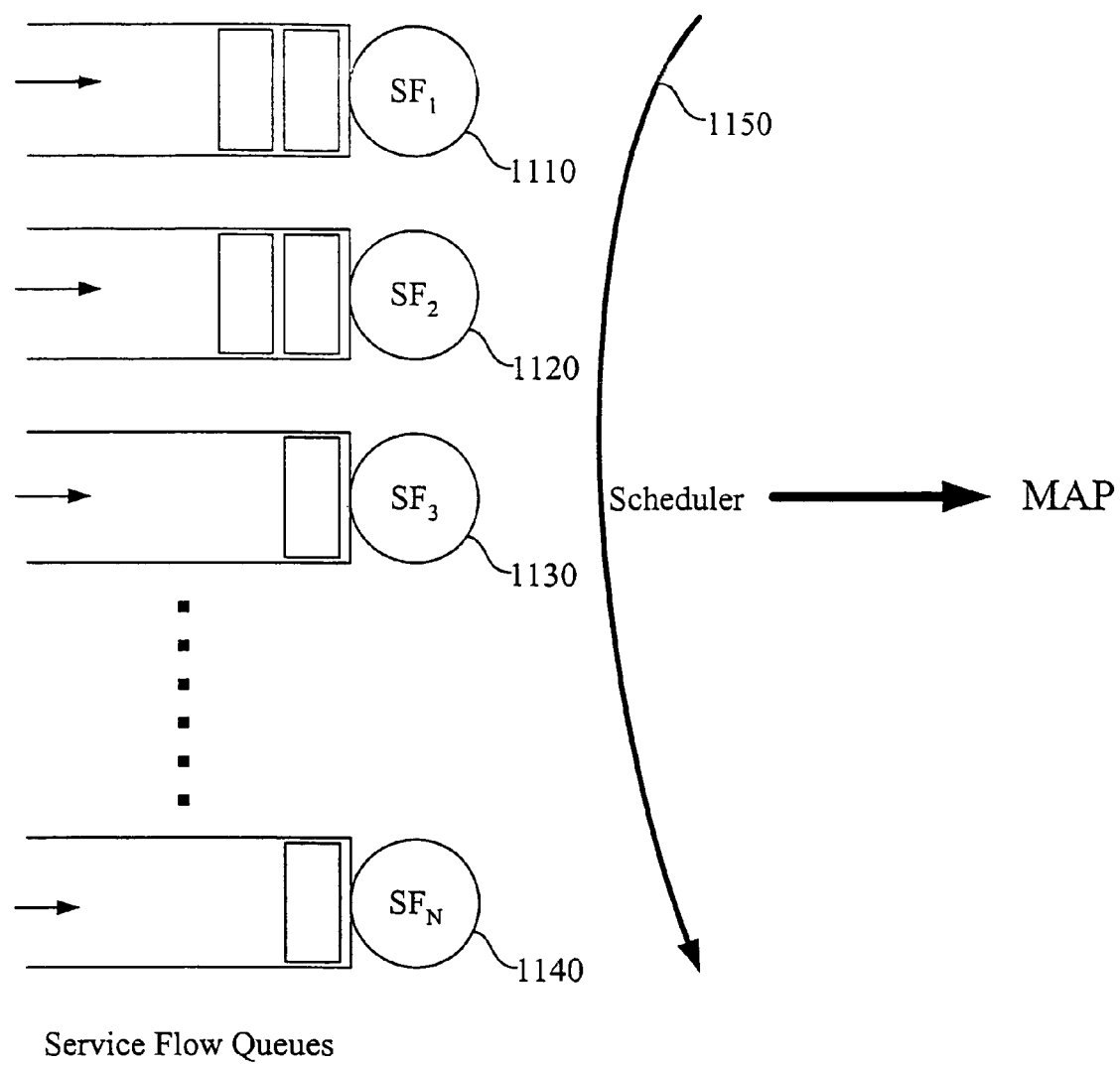
FIG. 11A shows a set of service flow requests that indicate demands for data by subscriber units.

FIG. 11A shows a set of service flow buffers 1110, 1120, 1130, 1140 that contain sub-protocol data units for subscriber units. The scheduler uses the service flow buffers 1110, 1120, 1130, 1140 to generate the sub-protocol data transmission schedule. The service flow buffers can contain different sizes of data. The scheduler addresses the service flow buffers, and forms the schedule.

The service flow buffers 1110, 1120, 1130, 1140 contain data for the subscriber units. The buffers 1110, 1120, 1130, 1140 are accessible by a processor within the base transceiver station.

The service flow buffers 1110, 1120, 1130, 1140 can contain a variety of types, and amounts of data. As will be described later, these factors influence how the scheduler maps the data demanded by the subscriber units.

The scheduler accesses service flow buffers 1110, 1120, 1130, 1140, during the generation of the map of the schedule.

As depicted in FIG. 11A by arrow 1150, an embodiment of the scheduler includes addressing each service flow sequentially and forming the map of the schedule. As will be described later, the data blocks dedicated to each service flow request is dependent upon a block weight. The block weight is generally dependent upon the priority of the particular demand for data.

Up Link Service Flow Request

Figure 11B:
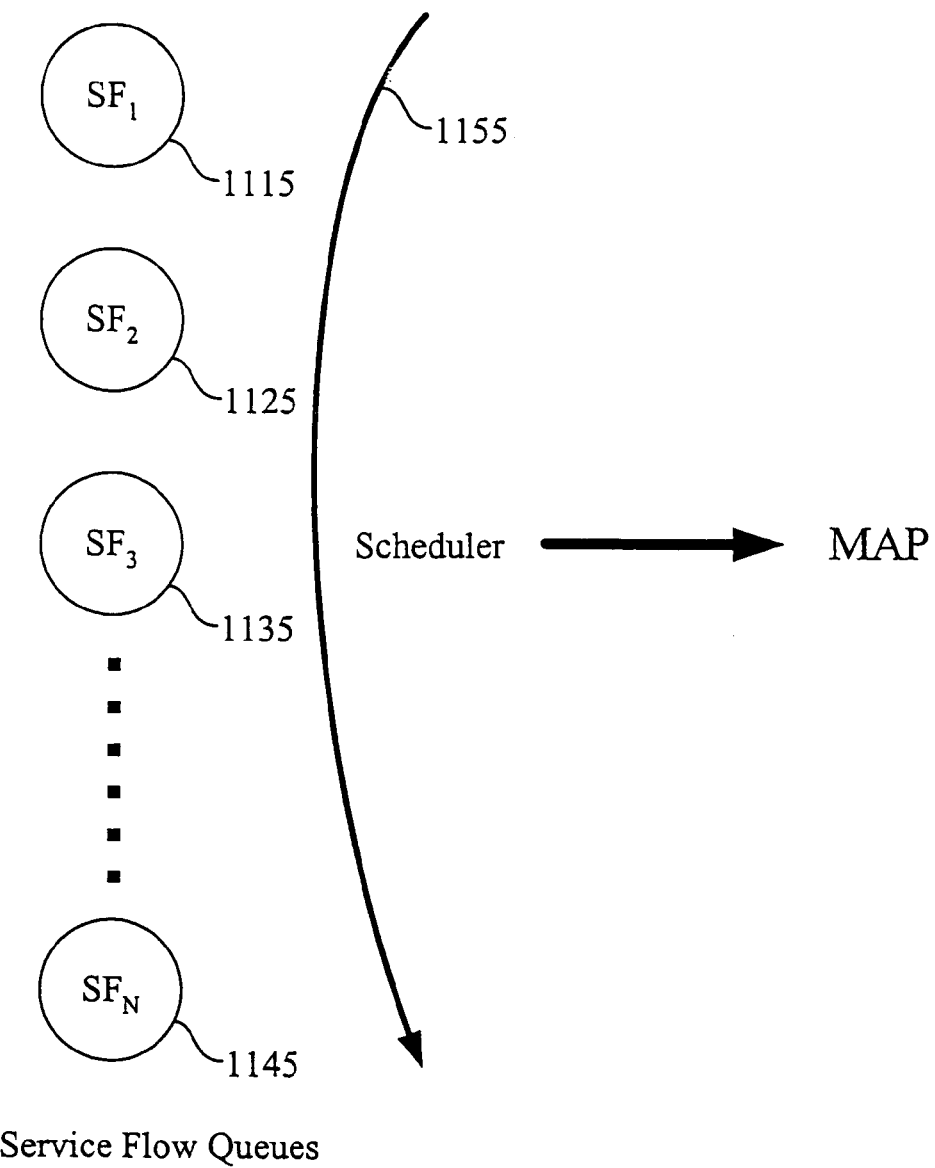
FIG. 11B shows a set of estimated service flow buffer sizes that indicate demands for up link data by subscriber units.

FIG. 11B shows a set of estimated service flow buffer sizes 1115 1125, 1135, 1145 that indicate demands for up link data by subscriber units. The scheduler uses the estimated service flow buffer sizes 1115, 1125, 1135, 1145 to generate the sub-protocol data up link transmission schedule. The scheduler addresses the estimated service flow buffer sizes forming the schedule.

The estimated service flow buffer sizes 1115, 1125, 1135, 1145 are estimated demands for data by the subscriber units. The estimated service flow buffer sizes 1115, 1125, 1135, 1145 are generally wirelessly received from the subscriber units by the base transceiver station. The estimated service flow buffer sizes 1115, 1125, 1135, 1145 can be queued in memory buffers that are accessible by a processor within the base transceiver station.

As depicted in FIG. 11B by arrow 1155, an embodiment of the scheduler includes addressing each estimated service flow buffer size sequentially and forming the map of the schedule. As will be described later, the data blocks dedicated to each estimated service buffer size is dependent upon a block weight. The block weight is generally dependent upon the priority of the particular demand for data.

A service flow request represents bi-directional requests (up stream and down stream) between a base transceiver station and a subscriber unit, with an associated set of quality of service parameters. Examples of service flow requests include constant bit rate (CBR) and unrestricted bit rate (UBR) service flow requests.

The CBR service flow requests include the scheduler scheduling the subscribers to receive or transmit sub-protocol data units periodically. The period can be a predetermined number of times per frame. Once a service flow request is made, the up link and down link bandwidth allocation is periodic. Information is transmitted to and from the subscriber units without the subscriber units having to send information size requests. Up link allocations are periodically scheduled without solicitation by the subscriber unit.

The UBR service flow requests include the scheduler scheduling the up link and down link scheduling based upon information size requests by the subscribers. The down link map allocations are made based upon the amount of data in the associated service flow buffers. The up link map allocations are made based upon the information size requests sent by the subscriber units. Each information size request updates the scheduler estimate of the amount of data in an associated service flow buffer.

Orthogonal Frequency Division Multiplexing (OFDM) Modulation

Frequency division multiplexing systems include dividing the available frequency bandwidth into multiple data carriers. OFDM systems include multiple carriers (or tones) that divide transmitted data across the available frequency spectrum. In OFDM systems, each tone is considered to be orthogonal (independent or unrelated) to the adjacent tones. OFDM systems use bursts of data, each burst of a duration of time that is much greater than the delay spread to minimize the effect of ISI caused by delay spread. Data is transmitted in bursts, and each burst consists of a cyclic prefix followed by data symbols, and/or data symbols followed by a cyclic suffix.

Figure 12:
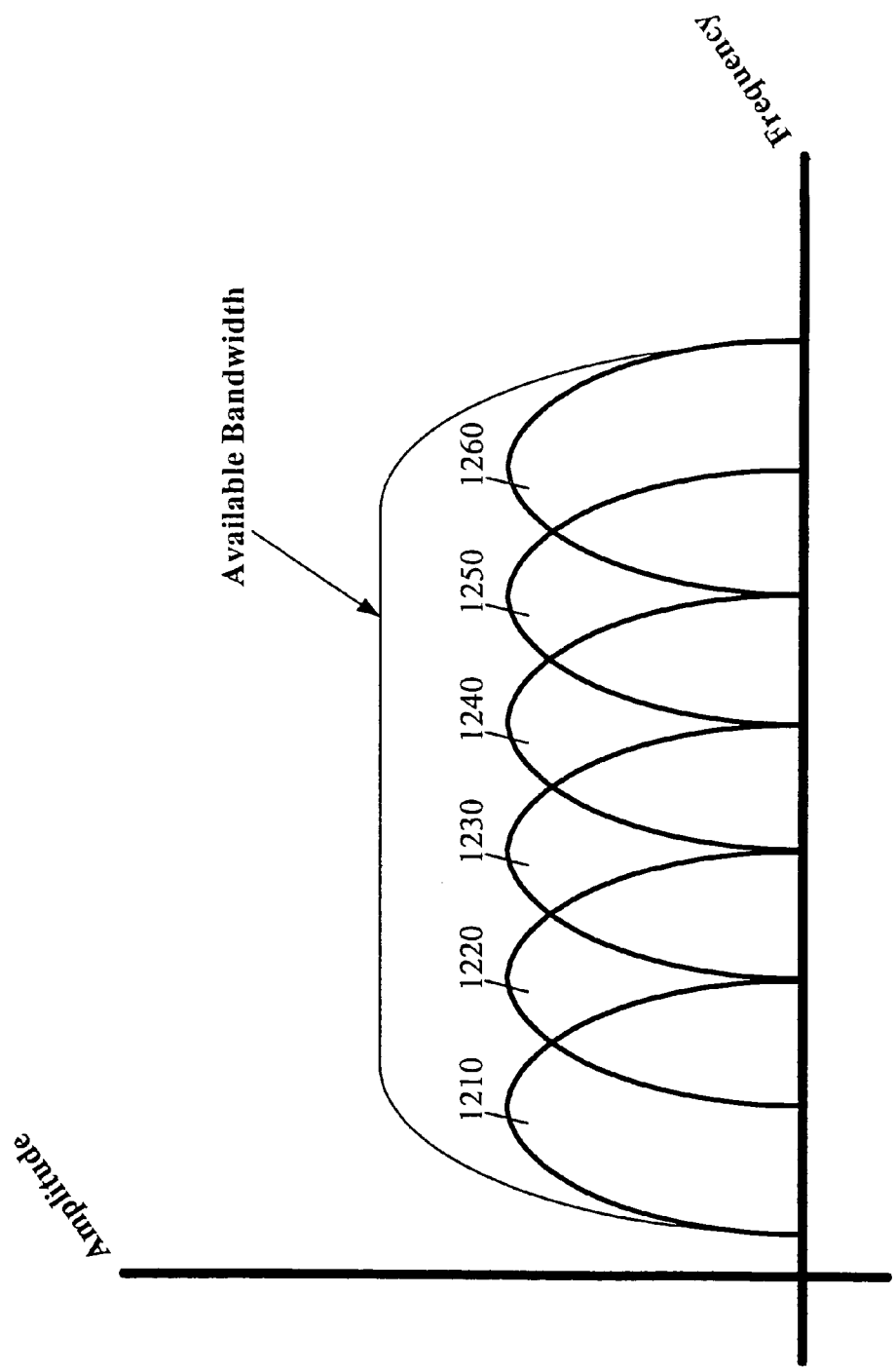
FIG. 12 shows a frequency spectrum of OFDM sub-carrier signals.

FIG. 12 shows a frequency spectrum of OFDM sub-carrier signals 1210, 1220, 1230, 1240, 1250, 1260. Each sub-carrier 1210, 1220, 1230, 1240, 1250, 1260 is modulated by separate symbols or combinations of symbols.

An example OFDM signal occupying 6 MHz is made up of 1224 individual carriers (or tones), each carrying a single QAM symbol per burst. A cyclic prefix or cyclic suffix is used to absorb transients from previous bursts caused by multipath signals. Additionally, the cyclic prefix or cyclic suffix causes the transmit OFDM waveform to look periodic. In general, by the time the cyclic prefix is over, the resulting waveform created by the combining multipath signals is not a function of any samples from the previous burst. Therefore, no ISI occurs. The cyclic prefix must be greater than the delay spread of the multipath signals.

Frame Structure

Figures 13A, 14:
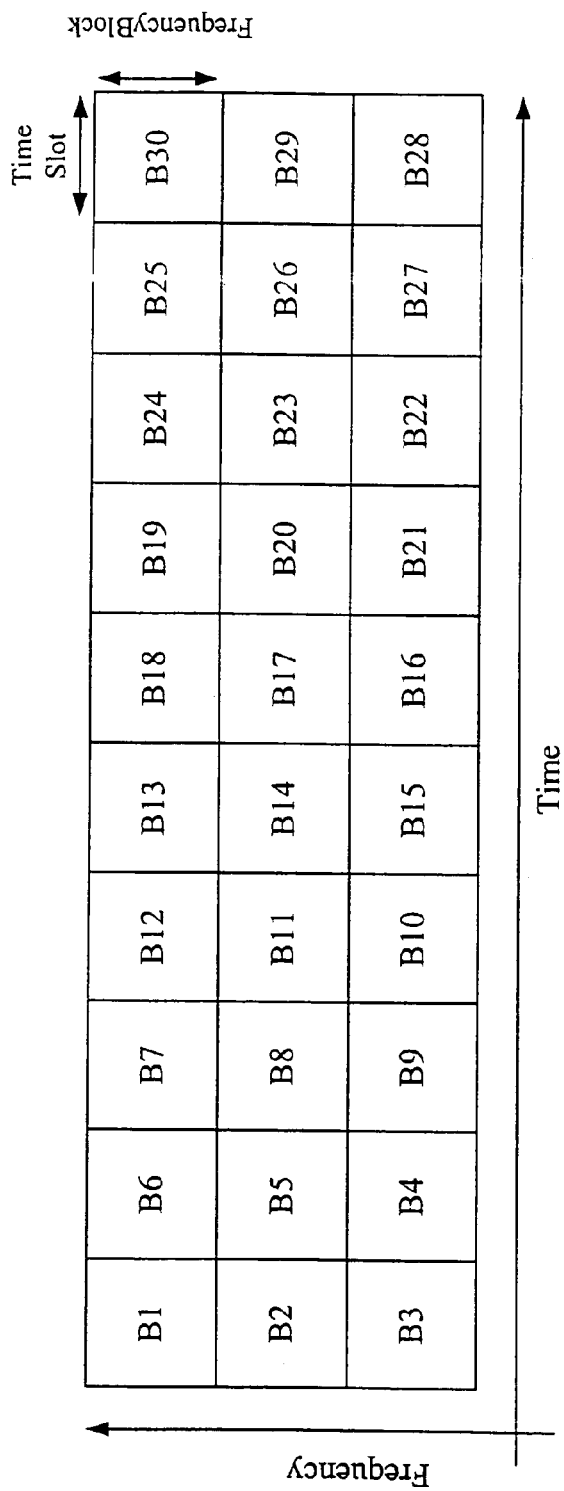
FIG. 13A shows a frame structure depicting blocks of transmission data defined by transmission time and transmission frequency.
FIG. 14 shows an example of a service flow table.

FIG. 13A shows a frame structure depicting blocks of transmission data defined by transmission time slots and transmission frequency blocks. The scheduler maps requests to transmit or receive data into such a frame structure. For example, data blocks B1, B2 and B3 can be transmitted during a first time slot, but over different frequency ranges or blocks. Data blocks B4, B5 and B6 are transmitted during a second time slot, but over different frequency ranges or blocks than each other. The different frequency ranges can be defined as different groupings or sets of the above-described OFDM symbols. As depicted in FIG. 13A, the entire transmission frequency range includes three frequency blocks within a frame.

Data blocks B1, B6, B7, B12, B13, B18, B19, B24, B25 and B30 are transmitted over common frequency ranges, but within different time slots. As depicted in FIG. 13A, ten time slots are included within a single frame. The number of time slots per frame is not necessarily fixed.

The numbering of the data blocks is depicted in the order chosen because of ease of implementation.

The data blocks generally occupy a predetermined amount of frequency spectrum and a predetermined amount of time. However, due to the variations in the possible types of modulation, the number of bits transmitted within a block is variable. That is, typically the data blocks include a predetermined number of OFDM symbols. The number of bits within an OFDM symbol is based on the type of modulation used in transmission. That is, a 4 QAM symbol includes fewer bits than a 16 QAM symbol. The number of bits included within a sub-protocol data unit is generally set to a predetermined number. Additionally, depending upon the quality of the transmission link, the bits to be transmitted can be coded, adding additional bits. Therefore, the number of sub-protocol data units included within a data block is variable. The variability of the number of sub-protocol unit included within a data block will be discussed further when discussing the transmission modes.

Figure 13B:
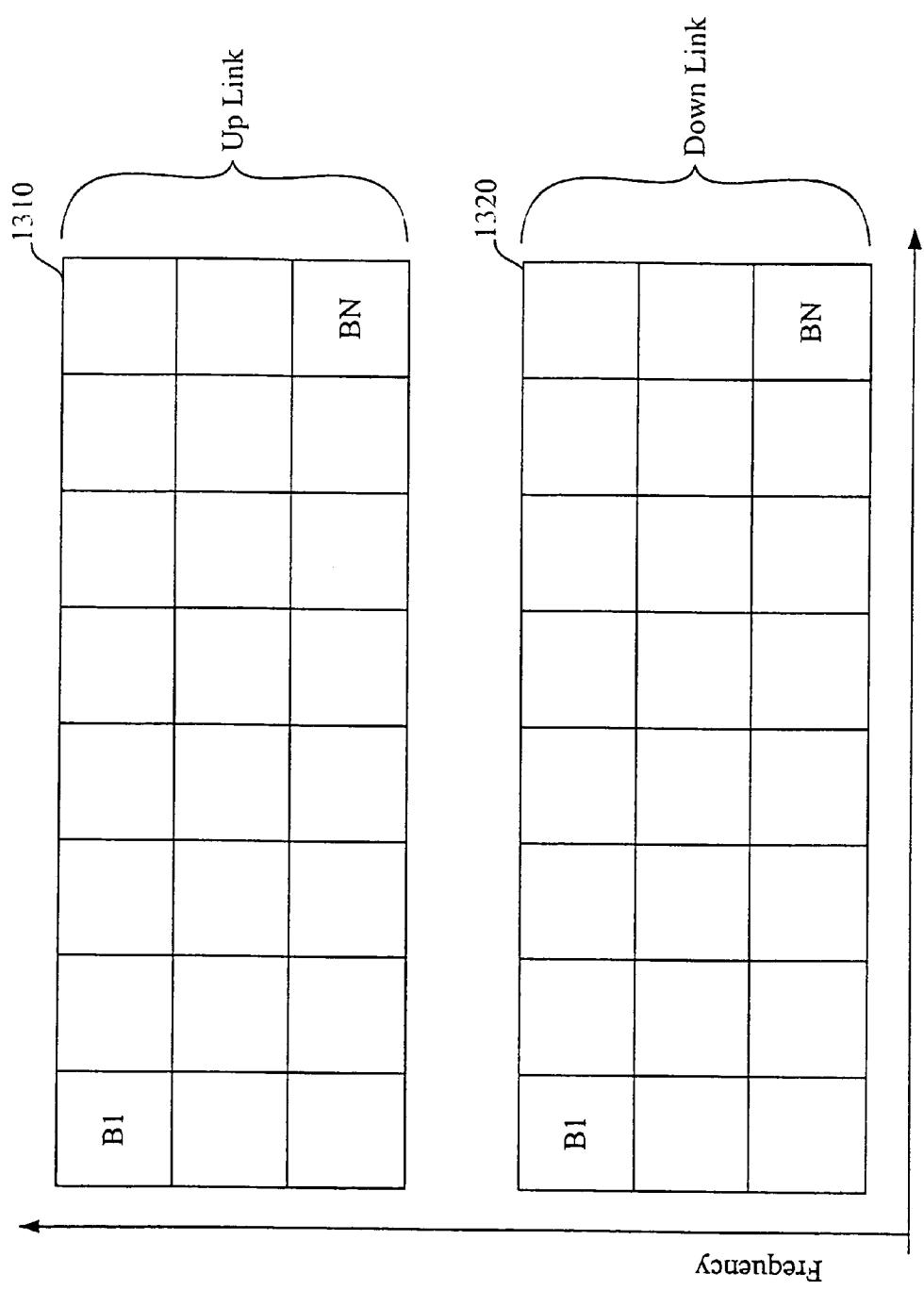
FIG. 13B shows a frame structure that includes an up link map transmitted at one frequency band, and a down link map transmitted at another frequency band.

FIG. 13B shows two maps 1310, 1320. A first map 1310 can be designated as the up link map, and a second map 1320 can be designated as the down link map. As shown in FIG. 13B, the up link map 1310 occupies a different frequency band than the down link map 1320. As described before, the maps include a finite number of frequency blocks and time slots. The maps 1310, 1320 of FIG. 13B are consistent with FDD transmission.

Figure 13C:
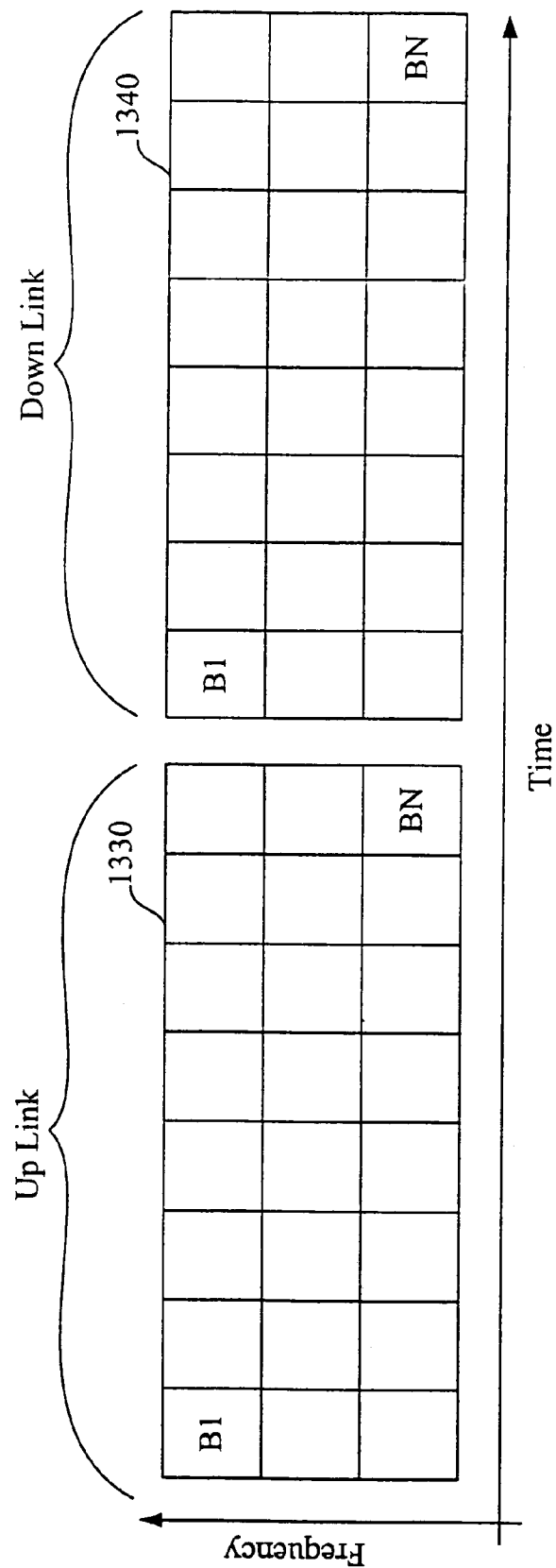
FIG. 13C shows a frame structure that include an up link map transmitted at a first time, and a down link map transmitted at a second time.

FIG. 13C also shows two maps 1330, 1340. A first map 1330 can be designated as the up link map, and a second map 1340 can be designated as the down link map. As shown in FIG. 13C, the up link map 1330 occupies a different time duration than the down link map 1340. As described before, the maps include a finite number of frequency blocks and time slots. The maps 1330, 1340 of FIG. 13C are consistent with TDD transmission.

Service Flow Request Table

FIG. 14 shows an example of a service flow table. The service flow table depicts information about each service flow request that is useful in generating the data block transmission schedule. The information included within the service flow table includes a service flow request identification number ($SF_1$, $SF_2$, $SF_3$, $SF_N$), a service flow queue size ($SFQ_1$, $SFQ_2$, $SFQ_3$, $SFQ_N$), a mode assignment ($M_1$, $M_2$, $M_3$, $M_N$) a block weight ($BW_1$, $BW_2$, $BW_3$, $BW_N$), and system mode (SM (spatial multiplexing), Diversity).

The service flow request identification number identifies each individual service flow request.

The service flow queue size provides information regarding the size or amount of information being requested by the service flow request.

The mode assignment provides information regarding the type of modulation and coding to be used when providing the data blocks of the service flow request. The mode assignment is generally determined by quality of the transmission link between the base station transceiver and the subscriber units. The quality of the transmission link can be determined in many different ways.

The transmission quality of the links between a subscriber unit and the base transceiver stations can be determined several different ways. A cyclic redundancy check (CRC) failure rate can be monitored. The higher the quality of the link, the lower the CRC failure rates. The monitoring of CRC failure rates of steams of symbols is well known in the field of communications.

A signal to interference of noise ratio (SINR) monitoring can also be used to determine the quality of the transmission links. Various techniques as are well known in the field of communications can be used to determine the SINR.

Based on the quality of the link between a base station transceiver and a subscriber unit, a transmission mode is assigned to the subscriber unit. As previously mentioned, the transmission mode determines the coding and modulation used in the transmission of data between the base station transceiver and a subscriber unit. The better the quality of the transmission link, the greater the amount of information that can be transmitted. For example, the better the quality of the link, the greater the allowable order of modulation. That is, 16 QAM generally requires a better transmission link than 4 QAM.

A poor quality link can require the transmitted data to be coded to minimize the error rate of the transmitted data. Generally, coding of the transmitted information reduces the rate the data is transmitted because the coding adds additional coding data. Examples of the types of coding used include convolutional coding and Reed Solomen coding. These common types of coding are well known in the field of communications.

The mode assignment can also determine other transmission characteristics. For example, the mode assignment can also be used for specifying transmission frequency bandwidth or transmission power.

The block weight determines the minimum number of previously described blocks that are allocated to a service flow request at a time. The block weight is generally determined according to the priority of the data being requested. That is, certain types of service flow requests are for higher priority information. By allocating a larger block weight, the service flow request will be satisfied more quickly.

For a service request having a block weight of two, for example, the mapping of the schedule will allocate two successive blocks to the service request. A larger block weight will cause a larger number of blocks to be allocated to a service request.

The system mode determines whether the transmission of the data includes spatial multiplexing, diversity, or neither. Again, the quality of the transmission link between the base station transceiver and the subscriber units generally determines whether the transmission should include spatial multiplexing or diversity.

Figure 15:
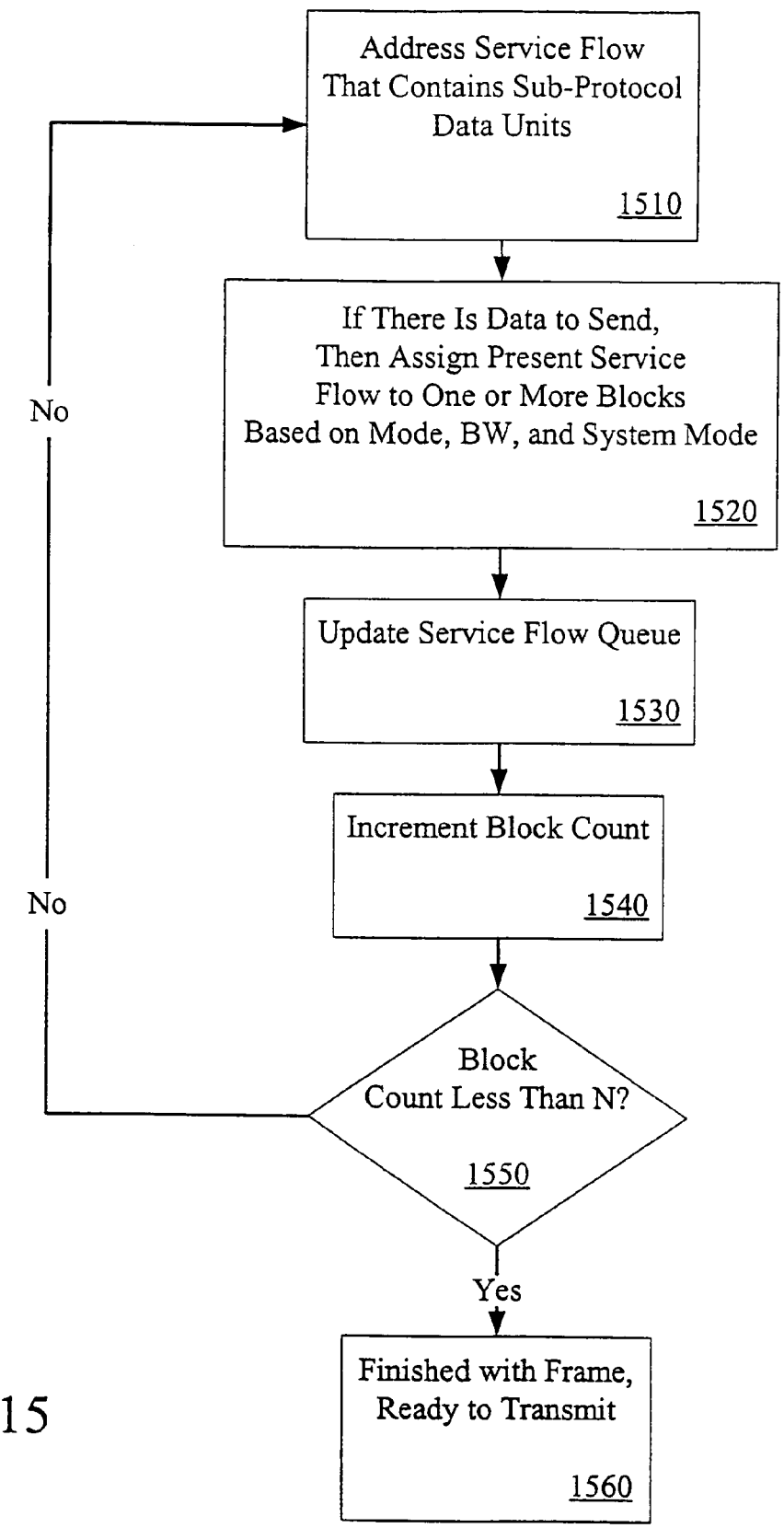
FIG. 15 shows a flow chart of steps included within an embodiment of a scheduler according to the invention.

FIG. 15 shows a flow chart of steps included within an embodiment of a scheduler according to the invention. As previously mentioned, the scheduler assigns time slots and frequency blocks in which sub-protocol data units are to be received by particular subscriber units. A schedule is generated once per a frame unit of time. A predetermined number of data blocks are included within a frame. Generally, the scheduler includes a weighted round robin assignment methodology.

The scheduler is generally implemented in software that runs on the controller within the base transceiver station. The controller is generally electronically connected to the MAC adaptation unit, the sub-protocol data buffers and the framing unit.

A first step 1510 includes addressing a service flow request.

A second step 1520 includes whether the present service flow request includes data to be sent. If data is to be sent, then the scheduler assigns the present service flow request to one or more data blocks based on the mode, block weight and system mode.

A third step 1530 includes updating the service flow queue. That is, sub-protocol data units have been assigned to data blocks, then the service flow queue should be updated to reflect the assignment.

A fourth step 1540 includes incrementing a block count. As previously mentioned, the mapping of a schedule only occurs once per frame. Each frame generally includes a predetermined number of frequency blocks and time slots. The block count begins when creating a map of a schedule. As service flow requests are addressed, a block counter is incremented. Note that the block weight will factor into the block count.

A fifth step 1550 includes checking whether the block count is equal to the predetermined number N. If the block count has reached the predetermined number, then all of the blocks within the present frame have been assigned. If the block count is less than the predetermined number N, then more blocks within the frame can be assigned sub-protocol data units.

A sixth step is executed once all of the blocks within a frame have been assigned. The mapped schedule of the frame can then be sent.

Transmission Modes

Figure 16:
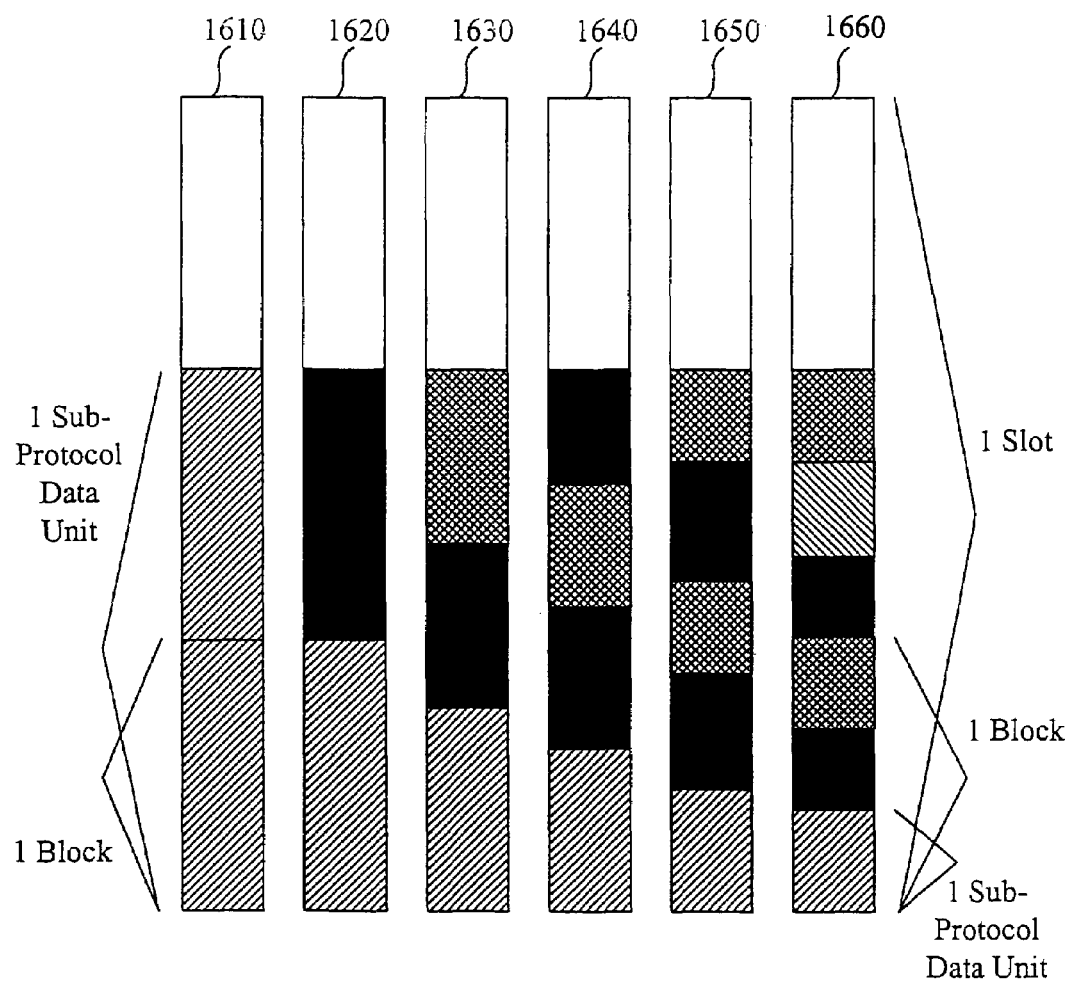
FIG. 16 depicts several modes of block transmission according to the invention.

FIG. 16 depicts several modes of block transmission according to the invention. The mode selection is generally based upon the quality of the transmission link between the base station transceiver and the subscriber units. The mode selection can determine the type of modulation (for example, 4 QAM, 16 QAM or 64 QAM), the type of coding (convolution or Reed Solomon), or whether the transmission includes spatial multiplexing or diversity.

As previously stated, several transmission link parameters can be used to establish the mode associated with the transmission of a sub-protocol data unit requested by a service flow. FIG. 16 depicts a relationship between a transmission data block (defined by a frequency block and time slot) and sub-protocol data unit according to an embodiment of the invention.

FIG. 16 shows a single time slot that is divided into three data block for six different modes. A first mode 1610 includes a sub-protocol data unit occupying two data blocks. A second mode 1620 includes a sub-protocol data unit occupying a single data block. A third mode 1630 includes three sub-protocol data units occupying two data blocks. A fourth mode 1640 includes two sub-protocol data units occupying one data block. A fifth mode 1650 includes five sub-protocol data units occupying two data blocks. A sixth mode 1660 includes three sub-protocol data units occupying a single data block.

As previously stated, the mode assignment determines the amount of information transmitted within each data block. Generally, the better the quality of the transmission link between a base transceiver station and a subscriber unit, the higher the mode assignment, and the greater the amount of information transmitted per data block.

It should be understood that the mode assignment of transmission links between base transceiver stations and subscriber units can vary from subscriber unit to subscriber unit. It should also be understood that the mode assignment of a transmission link between a base transceiver station and a subscriber unit can change from time frame to time frame.

It is to be understood that the number of frequency blocks allocated per time slot is variable. An embodiment of the scheduler includes the scheduler taking into consideration constraints on the frequency bandwidth on either the up link or the down link transmission. The frequency bandwidth allocations can be adjusted by varying the number of frequency blocks within a time slot. The frequency bandwidth allocated to a subscriber can be limited due to signal to noise issues, or the Federal Communication Committee (FCC) limitations. The scheduler can account for these limitations though allocations of frequency bandwidth through the scheduling.

The description of the invention has been limited to FDMA and TDMA. However, it is to be understood that the principles and concepts of the invention can be extended to include CDMA.

Sleep and Paging Modes

The subscriber units can be configured to include a sleep or paging mode. In the sleep mode, the subscriber units that are not scheduled to receive or transmit data units, power down to save power. That is, if the map schedule of a frame does not include transmission between any base transceiver station and a subscriber unit, the subscriber unit powers down for that particular frame. Therefore, the subscriber unit requires less power. A paging mode extends the power down period to multiple frames. In paging mode, a subscriber unit only powers up when a request for transmission of data is received. The request can be received at particular points in time, for example, when synchronization signals are received by the subscribers from the base transceiver stations.

Data Block Headers

As previously mentioned, the map of the schedule of each frame is transmitted to all subscriber units at the beginning of the transmission of a frame. Additionally, the service flow identification and mode selection for each frequency block and time slot is generally transmitted within a header of the data block transmitted within the frequency block and time slot.

Figure 17:
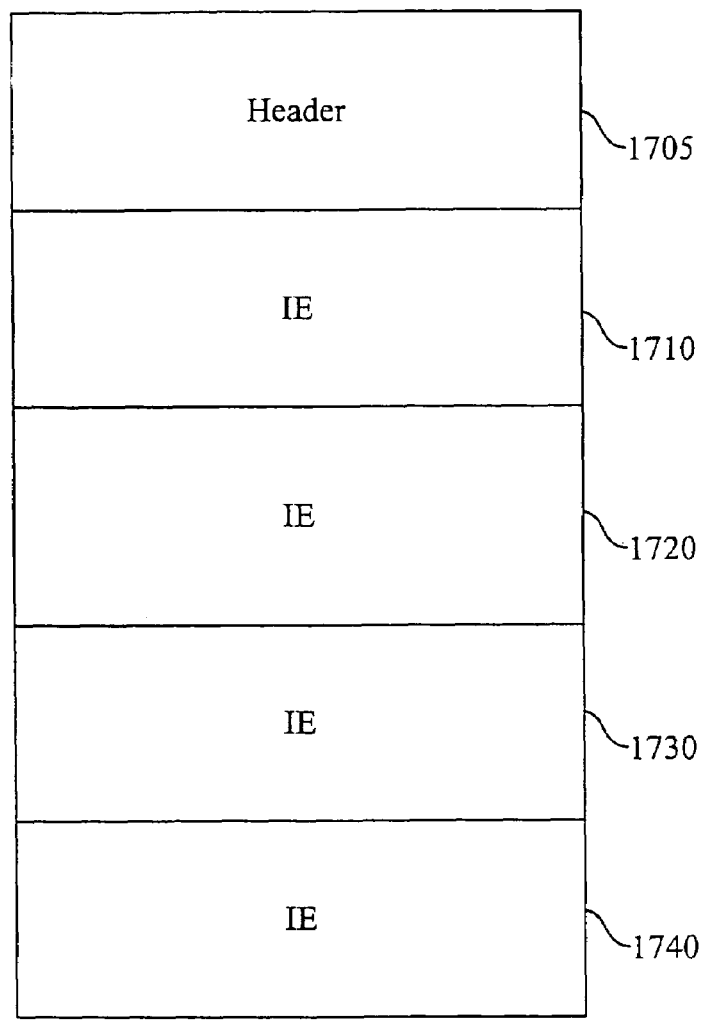
FIG. 17 shows a structure of a map message that is sent once per frame.

FIG. 17 shows a structure of a map message that is sent once per frame. The map message includes a header 1705, and information elements (IE's) 1710, 1720, 1730, 1740. The header includes the number of the associated frame. The IE's 1710, 1720, 1730, 1740 include a service flow identification, a mode number, the number of blocks associated with the service flow identification, and information indicating whether the service flow is up link or down link.

Although specific embodiments of the invention have been described and illustrated, the invention is not to be limited to the specific forms or arrangements of parts so described and illustrated. The invention is limited only by the appended claims.

What is claimed is:

1. A wireless communication device comprising:
   a controller running a scheduler, to generate a schedule of time slots and frequency blocks in which sub-protocol data units are to be transmitted from one or more transmitter(s) to the subscriber unit based, at least in part, on an estimate of time delays incurred in communicating sub-protocol data units from the scheduler unit to the transmitter(s).

2. A wireless communication device according to claim 1, further comprising:
   one or more transmitter(s), responsive to the scheduler, to transmit at least a subset of sub-protocol data units to one or more remote communication device(s).

3. A wireless communication device according to claim 1, wherein the time delays are used to generate the schedule by using the time delays to project a timing of when the sub-protocol data units are to be wirelessly transmitted from the transmitters.

4. A wireless communication device according to claim 3, wherein the time delay are used to generate a look ahead schedule that compensates for the timing delays of the sub-protocol data units from the scheduler unit to the transmitters.

5. A system comprising:
   one or more antenna(e) through which a wireless communication channel can be established with a remote system;
   one or more transmitters, selectively coupled with the one or more antenna(e) to transmit content including sub-protocol data units to remote communication device(s); and
   a controller running a scheduler, selectively coupled to at least a subset of the one or more transmitters, to generate a schedule of time slots and frequency blocks in which sub-protocol data units are to be transmitted from selects ones of the one or more transmitter(s) based, at least in part, on an estimate of time delays incurred in communicating sub-protocol data units from the scheduler unit to the transmitter(s).

* * * * *